(12) United States Patent
Belosludtcev et al.

(10) Patent No.: US 12,301,941 B2
(45) Date of Patent: *May 13, 2025

(54) RECOMMENDING RELEVANT CONTENT AUGMENTATIONS BASED ON CONTEXT

(71) Applicant: Snap Inc., Santa Monica, CA (US)

(72) Inventors: Nikita Belosludtcev, London (GB); Nikita Demidov, London (GB); Roman Golobokov, London (GB); Mariya Apanovych, Playa Vista, CA (US); Yuelin Cheng, Kirkland, WA (US); Jeremy Baker Voss, Los Angeles, CA (US); Sergey Smetanin, London (GB); David Phillip Taitz, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 87 days.

This patent is subject to a terminal disclaimer.

(21) Appl. No.: 18/322,397

(22) Filed: May 23, 2023

(65) Prior Publication Data

US 2024/0397156 A1 Nov. 28, 2024

(51) Int. Cl.
*H04N 21/472* (2011.01)
*H04N 21/466* (2011.01)

(52) U.S. Cl.
CPC ....... *H04N 21/472* (2013.01); *H04N 21/4668* (2013.01)

(58) Field of Classification Search
None
See application file for complete search history.

(56) References Cited

U.S. PATENT DOCUMENTS

| | | |
|---|---|---|
| 6,871,006 B1 | 3/2005 | Oguz et al. |
| 7,362,946 B1 | 4/2008 | Kowald |
| 7,512,886 B1 | 3/2009 | Herberger et al. |

(Continued)

FOREIGN PATENT DOCUMENTS

| | | | | |
|---|---|---|---|---|
| AU | 2017100670 A4 | * | 7/2017 | ........... G06F 16/178 |
| CN | 101808152 B | * | 10/2012 | |

(Continued)

OTHER PUBLICATIONS

"U.S. Appl. No. 17/307,458, Notice of Allowance mailed Sep. 14, 2021", 12 pgs.

(Continued)

*Primary Examiner* — William J Kim
(74) *Attorney, Agent, or Firm* — Schwegman Lundberg & Woessner, P.A.

(57) ABSTRACT

In some examples, a method includes determining that a listing of other users is to be displayed on a user interface for a first user, accessing augmentation trigger criteria, applying the augmentation trigger criteria to user profile data, determining, based on the application of the augmentation trigger criteria to the user profile data, that a second user meet a trigger criterion of the one or more augmentation trigger criteria. The method then includes identifying at least one recommended content augmentation associated with the trigger criterion and causing display of a first selectable user interface element associated with the at least one recommended content augmentation with the listing of other users on the user interface.

20 Claims, 12 Drawing Sheets

(56) References Cited

U.S. PATENT DOCUMENTS

| | | |
|---|---|---|
| 9,396,354 B1 | 7/2016 | Murphy et al. |
| 9,482,882 B1 | 11/2016 | Hanover et al. |
| 9,482,883 B1 | 11/2016 | Meisenholder |
| 9,838,730 B1 | 12/2017 | Matias |
| 10,178,365 B1 | 1/2019 | Singh et al. |
| 10,348,662 B2* | 7/2019 | Baldwin ............... H04L 51/222 |
| 10,348,960 B1 | 7/2019 | Sehn |
| 10,354,425 B2 | 7/2019 | Yan et al. |
| 10,380,394 B1 | 8/2019 | Boyd et al. |
| 10,540,575 B1* | 1/2020 | Brody .................... H04N 23/63 |
| 10,580,458 B2 | 3/2020 | Sehn |
| 10,623,891 B2 | 4/2020 | Sehn et al. |
| 10,638,256 B1 | 4/2020 | Suiter |
| 10,691,967 B2 | 6/2020 | Zak et al. |
| 10,754,525 B1 | 8/2020 | Al Majid et al. |
| 10,783,927 B1 | 9/2020 | Davis |
| 10,805,696 B1 | 10/2020 | Suiter et al. |
| 10,839,219 B1 | 11/2020 | Suiter et al. |
| 10,893,055 B2 | 1/2021 | Allen et al. |
| 10,956,793 B1 | 3/2021 | Wang et al. |
| 10,984,547 B2 | 4/2021 | Ezra et al. |
| 10,990,697 B2 | 4/2021 | Murphy et al. |
| 10,997,758 B1 | 5/2021 | Yan et al. |
| 11,044,393 B1 | 6/2021 | Suiter et al. |
| 11,099,643 B1 | 8/2021 | Miller et al. |
| 11,128,715 B1 | 9/2021 | Al Majid et al. |
| 11,153,665 B2 | 10/2021 | Beck et al. |
| 11,157,558 B2 | 10/2021 | Beck et al. |
| 11,163,941 B1 | 11/2021 | Al Majid et al. |
| 11,201,981 B1 | 12/2021 | Suiter et al. |
| 11,216,869 B2 | 1/2022 | Allen et al. |
| 11,227,637 B1 | 1/2022 | Collins et al. |
| 11,297,399 B1 | 4/2022 | Tang |
| 11,301,960 B2 | 4/2022 | Chang et al. |
| 11,308,653 B2 | 4/2022 | Yoon et al. |
| 11,349,796 B2 | 5/2022 | Tang |
| 11,372,608 B2 | 6/2022 | Sehn |
| 11,388,226 B1 | 7/2022 | Anderton et al. |
| 11,496,544 B2 | 11/2022 | Pavlovskaia et al. |
| 11,563,886 B2 | 1/2023 | Bartow et al. |
| 11,721,367 B2 | 8/2023 | Collins et al. |
| 2003/0160944 A1 | 8/2003 | Foote et al. |
| 2005/0187912 A1* | 8/2005 | Matsa ................. G06F 9/44505 |
| 2005/0286519 A1* | 12/2005 | Ravikumar ........... H04L 67/104 |
| | | 370/389 |
| 2006/0271696 A1* | 11/2006 | Chen ....................... H04L 51/58 |
| | | 709/229 |
| 2007/0280452 A1* | 12/2007 | Bernard .................. H04L 51/04 |
| | | 379/201.01 |
| 2008/0016114 A1 | 1/2008 | Beauregard et al. |
| 2008/0045176 A1* | 2/2008 | Ho ...................... H04M 1/72502 |
| | | 455/344 |
| 2008/0092168 A1 | 4/2008 | Logan et al. |
| 2010/0183280 A1 | 7/2010 | Beauregard et al. |
| 2012/0278710 A1* | 11/2012 | Berger ............... G06Q 30/0641 |
| | | 715/739 |
| 2013/0042169 A1* | 2/2013 | Reedy .................... G06Q 50/01 |
| | | 715/201 |
| 2013/0077937 A1 | 3/2013 | Kennedy et al. |
| 2015/0160916 A1 | 6/2015 | Lothian |
| 2015/0279427 A1 | 10/2015 | Godfrey et al. |
| 2016/0155475 A1 | 6/2016 | Hamer |
| 2016/0196052 A1 | 7/2016 | Franklin et al. |
| 2017/0017658 A1 | 1/2017 | Blong et al. |
| 2017/0357382 A1* | 12/2017 | Miura ................. G06F 3/04842 |
| 2018/0026925 A1 | 1/2018 | Kennedy |
| 2018/0068019 A1 | 3/2018 | Novikoff et al. |
| 2018/0089904 A1 | 3/2018 | Jurgenson et al. |
| 2018/0188899 A1 | 7/2018 | Nigam et al. |
| 2018/0191797 A1* | 7/2018 | Javier .................. H04L 65/764 |
| 2018/0295396 A1 | 10/2018 | Ramadorai et al. |
| 2018/0348966 A1* | 12/2018 | Scoville ................. H04L 51/52 |
| 2018/0357634 A1* | 12/2018 | Shin ..................... G06Q 20/36 |
| 2019/0012765 A1 | 1/2019 | Egri et al. |
| 2019/0140990 A1 | 5/2019 | Rabbat et al. |
| 2019/0392866 A1 | 12/2019 | Yoon et al. |
| 2020/0201969 A1 | 6/2020 | Jo et al. |
| 2020/0320767 A1* | 10/2020 | Al Majid ............. G06V 40/161 |
| 2020/0353366 A1 | 11/2020 | Titus |
| 2020/0358731 A1 | 11/2020 | Boyd et al. |
| 2020/0366395 A1 | 11/2020 | Brenner et al. |
| 2020/0409729 A1* | 12/2020 | Al Majid ................ G06F 9/451 |
| 2020/0412864 A1* | 12/2020 | Al Majid ............. G06F 3/0488 |
| 2021/0014238 A1 | 1/2021 | Allen et al. |
| 2021/0136521 A1 | 5/2021 | Al Majid et al. |
| 2021/0144422 A1 | 5/2021 | Wagner et al. |
| 2021/0304469 A1* | 9/2021 | Heikkinen .......... G06F 3/04817 |
| 2021/0336916 A1* | 10/2021 | Boyd ...................... G06F 9/451 |
| 2021/0350131 A1 | 11/2021 | Ouimet et al. |
| 2022/0086340 A1 | 3/2022 | Ebsen et al. |
| 2022/0131948 A1 | 4/2022 | Al Majid et al. |
| 2022/0293133 A1 | 9/2022 | Spreitzer et al. |
| 2022/0318566 A1 | 10/2022 | Krishnan Gorumkonda |
| 2022/0319552 A1 | 10/2022 | Collins et al. |
| 2022/0375137 A1 | 11/2022 | Anvaripour et al. |
| 2022/0406008 A1 | 12/2022 | Jurgenson et al. |
| 2023/0004278 A1 | 1/2023 | Anvaripour et al. |
| 2023/0326490 A1 | 10/2023 | Collins et al. |
| 2023/0344953 A1 | 10/2023 | Anvaripour et al. |
| 2023/0396572 A1* | 12/2023 | Heikkinen .......... G06Q 30/0241 |
| 2024/0395286 A1 | 11/2024 | Brown et al. |

FOREIGN PATENT DOCUMENTS

| | | | | |
|---|---|---|---|---|
| CN | 105814634 | | 7/2016 | |
| CN | 110572722 | | 12/2019 | |
| CN | 111669625 | | 9/2020 | |
| CN | 117157710 | | 12/2023 | |
| EP | 1587111 | | 10/2005 | |
| JP | 2003141038 A | * | 5/2003 | ............. H04L 29/06 |
| WO | 2022072689 | | 4/2022 | |
| WO | 2022212127 | | 10/2022 | |
| WO | 2023235584 | | 12/2023 | |
| WO | 2024249275 | | 12/2024 | |

OTHER PUBLICATIONS

"International Application Serial No. PCT/US2022/021345, International Search Report mailed Jul. 21, 2022", 4 pgs.

"International Application Serial No. PCT/US2022/021345, Written Opinion mailed Jul. 21, 2022", 6 pgs.

"U.S. Appl. No. 17/546,726, Notice of Allowance mailed Mar. 13, 2023", 12 pgs.

"U.S. Appl. No. 17/546,726, 312 Amendment filed Jun. 13, 2023".

"U.S. Appl. No. 17/546,726, PTO Response to Rule 312 Communication mailed Jul. 3, 2023", 2 pgs.

"International Application Serial No. PCT/US2023/024315, International Search Report mailed Sep. 19, 2023", 3 pgs.

"International Application Serial No. PCT/US2023/024315, Written Opinion mailed Sep. 19, 2023", 4 pgs.

"International Application Serial No. PCT/US2022/021345, International Preliminary Report on Patentability mailed Oct. 12, 2023", 9 pgs.

"Chinese Application Serial No. 202280026550.3, Voluntary Amendment filed Mar. 5, 2024", w/ English Translation of Claims, 17 pgs.

"U.S. Appl. No. 18/208,680, Non Final Office Action mailed Mar. 15, 2024", 16 pgs.

"Chinese Application Serial No. 202280026550.3, Office Action mailed Mar. 28, 2024", w/ English translation, 13 pgs.

"U.S. Appl. No. 18/205,319, Non Final Office Action mailed May 3, 2024", 17 pgs.

"U.S. Appl. No. 18/208,680, Response filed Jun. 14, 2024 to Non Final Office Action mailed Mar. 15, 2024", 10 pgs.

"U.S. Appl. No. 18/208,680, Final Office Action mailed Aug. 9, 2024", 20 pgs.

"Korean Application Serial No. 10-2023-7036252, Notice of Preliminary Rejection mailed Jul. 26, 2024", w/ English translation, 9 pgs.

(56) References Cited

OTHER PUBLICATIONS

"International Application Serial No. PCT/US2024/030873, International Search Report mailed Aug. 29, 2024", 4 pgs.

"International Application Serial No. PCT/US2024/030873, Written Opinion mailed Aug. 29, 2024", 4 pgs.

"U.S. Appl. No. 18/205,319, Response filed Sep. 3, 2024 to Non Final Office Action mailed May 3, 2024", 11 pgs.

"U.S. Appl. No. 18/208,680, Response filed Oct. 9, 2024 to Final Office Action mailed Aug. 9, 2024", 10 pgs.

"U.S. Appl. No. 18/205,319, Notice of Allowance mailed Nov. 12, 2024", 9 pgs.

"Chinese Application Serial No. 202280026550.3, Response filed Jul. 26, 2024 to Office Action mailed Mar. 28, 2024", w/ current English claims, 8 pgs.

"U.S. Appl. No. 18/208,680, Notice of Allowance mailed Dec. 6, 2024", 5 pgs.

"International Application Serial No. PCT/US2023/024315, International Preliminary Report on Patentability mailed Dec. 12, 2024", 6 pgs.

\* cited by examiner

RECOMMENDING RELEVANT CONTENT AUGMENTATIONS BASED ON CONTEXT

TECHNICAL FIELD

The present disclosure relates generally to content augmentation, and more specifically to the recommendation of relevant content augmentations based on contextual information.

BACKGROUND

As the popularity of online mobile applications grows, companies use data analysis techniques to provide recommended content to users. These recommendations aim to provide the most value to users by showing them content that is relevant and interesting to them. Subject to regulations and privacy laws worldwide, companies collect vast amounts of data from users, including their interests, demographic information, browsing history, likes, shares, comments, and connections with other users. Based on the collected data, companies create a user profile that is used to identify relevant content on their platforms. Companies may also employ natural language processing and image recognition techniques to better understand the content.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which.

DETAILED DESCRIPTION

Figure 1:
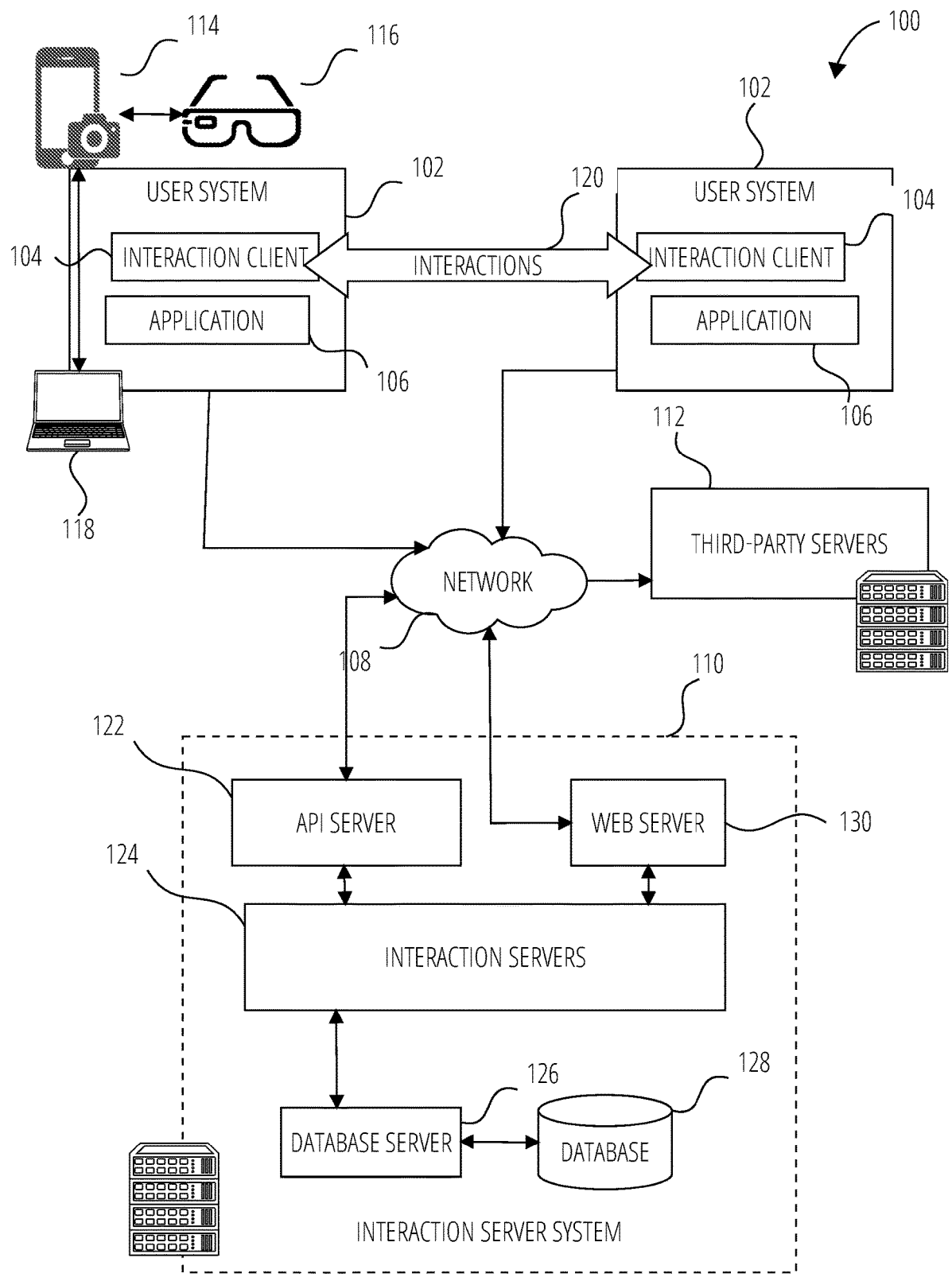
FIG. 1 is a diagrammatic representation of a networked environment in which the present disclosure may be deployed, according to some examples.

Example interaction systems display relevant content augmentations adjacent to a listing of other users, such as a friends feed, list of message conversations, and/or the like. Initially, the system applies certain triggers to user data, the user's friend data, or interactions between the two, to identify relevant content augmentations. Examples of triggers include a friend's birthday, a friend's post or change to their profile, or certain topics of discussion in a chat window. Suggesting relevant content augmentations creates inspiration for users, lowers the effort required to send augmented content between users, increases conversion rates of content augmentations, and improves overall user engagement.

Example interaction systems assess certain contextual data to determine a set of content augmentations that would fit best, such as a "happy birthday" content augmentation when it is a friend's birthday. The system displays the listing of other users. Next to the user with the birthday, the system displays a selectable user interface element (e.g., selectable icon), that when selected, displays the set of recommended content augmentations. Upon selection of a particular content augmentation, the system opens a camera feed that initially applies the selected content augmentation to content captured by a camera system. The user then takes a photo or records a video, and sends it to the friend.

In example interaction systems, the content augmentation adds digital elements to content captured by a camera system, such as by modifying, overlaying, altering, or otherwise augmenting such camera content. The user has the option to transmit a live stream or capture a photo or video to send to a person. The content augmentation may recognize objects or features, such as facial features and movements, and may overlay fun animated effects, such as a hat, or change a face in real-time.

Example interaction systems determine which content augmentation to recommend based on historical conversion rates. The system determines preferences of users for certain types of content augmentations in similar contexts based on prior types of content augmentations displayed to the user and user selections. In some examples, the system identifies conversion rates for the particular friend associated with the trigger. In other examples, the system determines conversion rates for the general population or a subset thereof, such as based on characteristics of the user or the friend (e.g., age, gender, location, other personal identifiable information, and/or the like).

Example interaction systems apply one or more machine learning modules. In some examples, a machine learning module is trained to identify relevant context of a chat discussion between users, such as the main topic of discussion. Another machine learning module is trained to identify the most relevant content augmentations based on a certain trigger and/or preferences of users, such as the most relevant content augmentations for birthdays or identifying the most effective content augmentation for a particular friend.

Advantageously, providing relevant content augmentations to users can encourage users to communicate with other users. Tying the content augmentation recommendations with triggers that are tied to activities, interactions, or profiles of users enhances the relevance of such content augmentations. Moreover, the system applies different types of triggers, such as triggers for the application user, user's friends (e.g., birthday), activity between the two (e.g., topics of discussion in a chat), and other external information (e.g., time of the day, holidays, weather) to identify the most relevant content augmentations. The system can identify interactions between users within sub-modules of the application such as a game with two players or external applications (e.g., see linked applications). Suggesting relevant content augmentations to users provide inspiration for users to connect with each other. Furthermore, providing such content augmentation recommendations on a user interface or on a listing of friends lowers the amount of effort (e.g., clicks on the user interface) to send an Extended Reality (XR)-augmented photo or video to a friend.

When the effects in this disclosure are considered in aggregate, one or more of the methodologies described herein may improve known systems, providing additional functionality (such as, but not limited to, the functionality mentioned above), making them easier, faster, or more intuitive to operate, and/or obviating a need for certain efforts or resources that otherwise would be involved in an electronic interaction process. Computing resources used by one or more machines, databases, or networks may thus be more efficiently utilized or even reduced.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the other interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an API server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the user systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from third-party servers 112 for example, a markup-language document associated with the small-scale application and processing such a document.

In response to determining that the external resource is a locally installed application 106, the interaction client 104 instructs the user system 102 to launch the external resource by executing locally stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
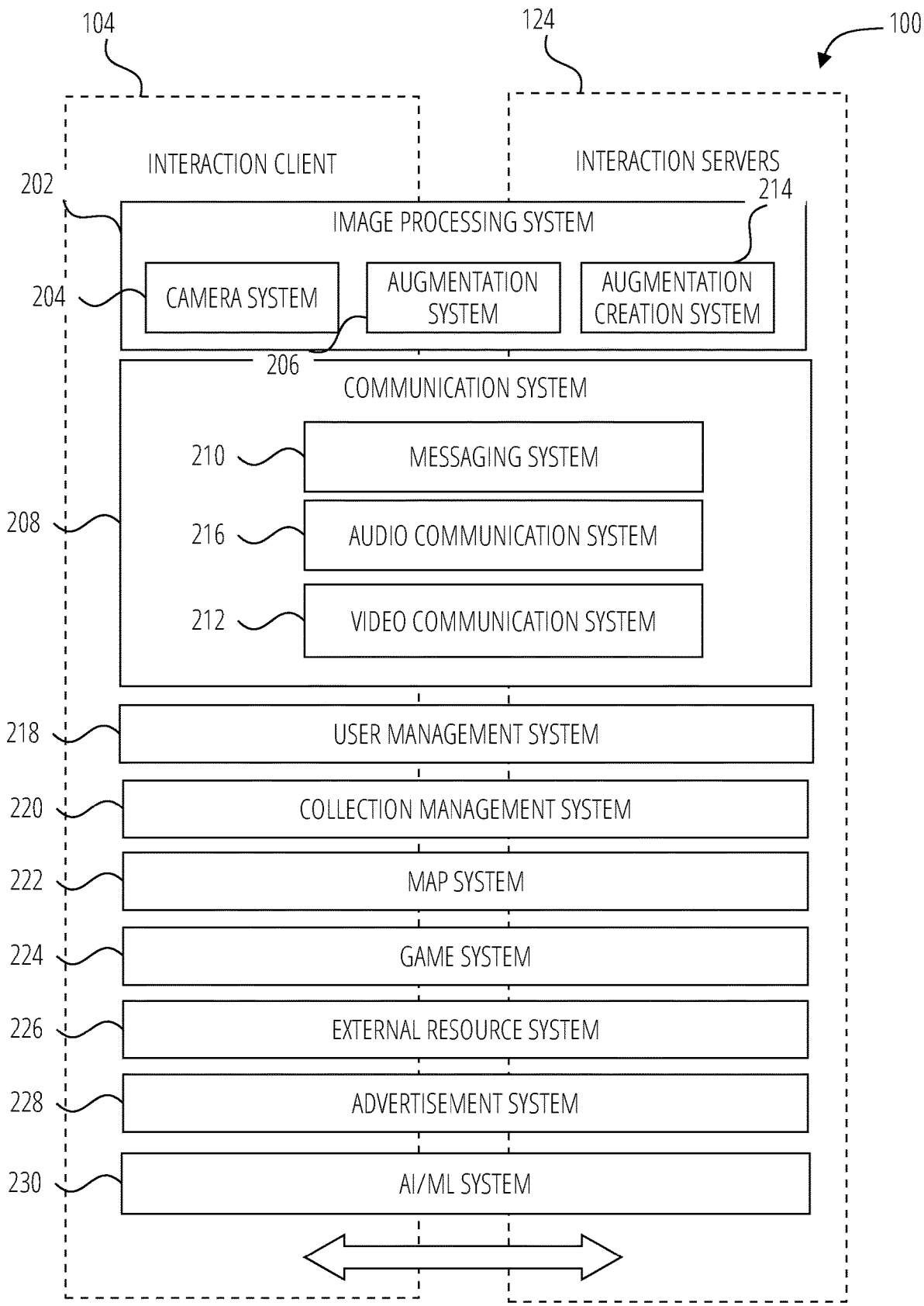
FIG. 2 is a diagrammatic representation of an interaction system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of a microservice subsystem may include:

Function logic: The function logic implements the functionality of the microservice subsystem, representing a specific capability or function that the microservice provides.

API interface: Microservices may communicate with other component through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below:

An image processing system 202 provides various functions that enable a user to capture and augment (e.g., annotate or otherwise modify or edit) media content associated with a message.

A camera system 204 includes control software (e.g., in a camera application) that interacts with and controls camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1102 of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports XR developer platforms and includes an application for content creators (e.g., artists and developers) to create and publish augmentations (e.g., XR experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 310 and profile data 302) regarding users and relationships between users of the interaction system 100. In some examples, the user management system 218 can initiate or apply triggers to contextual data. The user management system 218 accesses user profile data, profile data of friends of the user, and/or data relevant to interactions between the user and the user's friends. The user management system 218 applies augmentation trigger criterion to such data and determines whether any of the augmentation trigger criterion is met. The user management system 218 inputs interaction data to a machine learning model in order to receive contextual data based on the inputted interaction data, such as identifying a topic of discussion in a chat window between the user and a friend, which then is applied to augmentation trigger criterion. The user management system 218 identifies when an augmentation trigger criterion has been met. The user management system 218 accesses a mapping between the augmentation trigger criterion and various content augmentations to determine which of the content augmentations are relevant for the augmentation trigger criterion. The user management system 218 displays the recommended content augmentations to the user that enable the user to record a picture or video from the camera system with a selected content augmentations applied, to then send to a friend or to post on the user's profile.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a graphical user interface (GUI) of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An artificial intelligence and machine learning system 230 provides a variety of services to different subsystems within the interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate images. The artificial intelligence and machine learning system 230 may be used by the augmentation system 206 to generate augmented content and XR experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic. The artificial intelligence and machine learning system 230 may also provide chatbot functionality to message interactions 120 between user systems 102 and between a user system 102 and the interaction server system 110. The artificial intelligence and machine learning system 230 may also work with the audio communication system 216 to provide speech recognition and natural language processing capabilities, allowing users to interact with the interaction system 100 using voice commands.

Data Architecture

Figure 3:
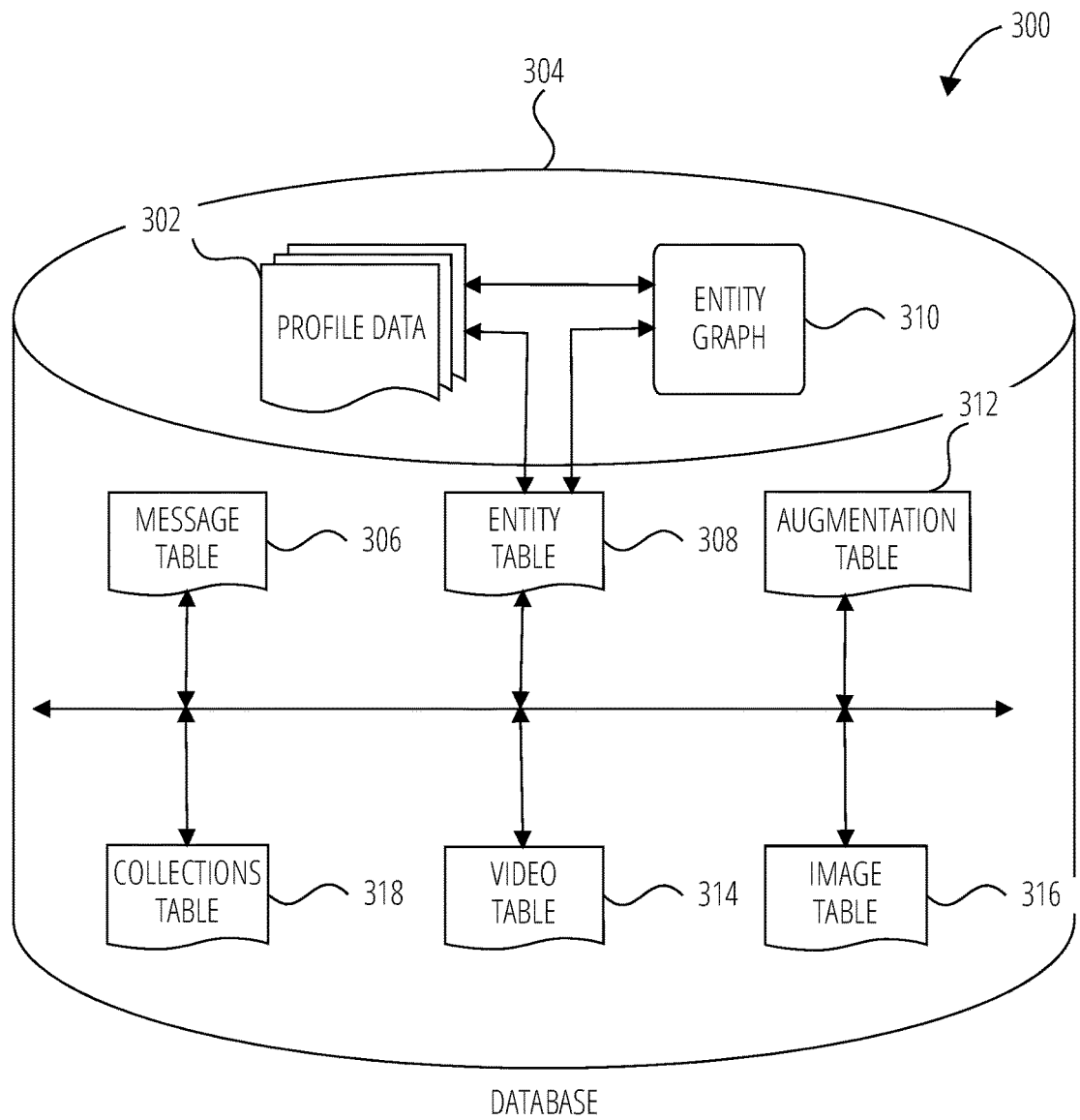
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100. A friend relationship can be established by mutual agreement between two entities. This mutual agreement may be established by an offer from a first entity to a second entity to establish a friend relationship, and acceptance by the second entity of the offer for establishment of the friend relationship.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of the user system 102 and then displayed on a screen of the user system 102 with the modifications. This also includes modifications to stored content, such as video clips in a collection or group that may be modified. For example, in a user system 102 with access to multiple augmented reality content items, a user can use a single video clip with multiple augmented reality content items to see how the different augmented reality content items will modify the stored clip. Similarly, real-time video capture may use modifications to show how video images currently being captured by sensors of a user system 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In some examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated. Then, a mesh based on the characteristic points is generated for each element of the object. This mesh is used in the following stage of tracking the elements of the object in the video stream. In the process of tracking, the mesh for each element is aligned with a position of each element. Then, additional points are generated on the mesh.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing the color of areas; removing some part of areas from the frames of the video stream; including new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation. In some examples of a computer animation model to transform image data using face detection, the face is detected on an image using a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

The system can capture an image or video stream on a client device (e.g., the user system 102) and perform complex image manipulations locally on the user system 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the user system 102.

In some examples, the system operating within the interaction client 104 determines the presence of a face within the image or video stream and provides modification icons associated with a computer animation model to transform image data, or the computer animation model can be present as associated with an interface described herein. The system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

A collections table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

Recommending Content Augmentations Based on User Profiles

Figure 4:
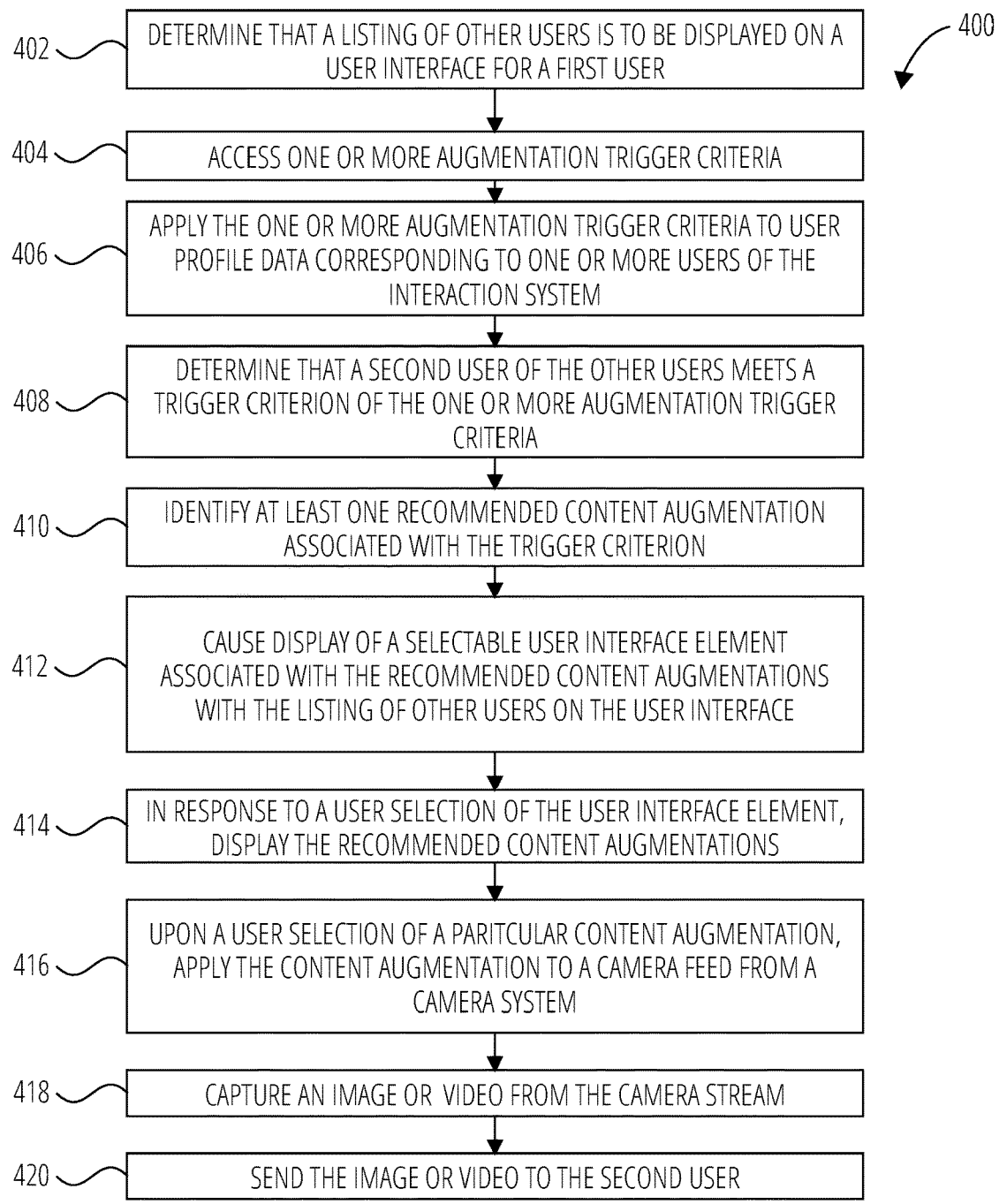
FIG. 4 illustrates a flowchart for recommending relevant content augmentations to users, according to some examples.

FIG. 4 illustrates a method 400 for recommending content augmentations for a first user when displaying a listing of other users, according to some examples. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

Extended Reality (XR) is an umbrella term encapsulating Augmented Reality (AR), Virtual Reality (VR), Mixed Reality (MR), and everything in between. For the sake of simplicity, examples are described using one type of system, such as XR or AR. However it is appreciated that other types of systems apply.

The interaction client determines that a listing of other users is to be displayed on a user interface for a first user at operation 402. A listing of other users can be a listing of friends, a listing of historical chats between the first user and other users, or other listings of other users, a phone book, missed calls, received calls, call history, and/or the like. In some examples, the interaction client determines that a listing of other users is to be displayed upon a user selecting an interface option on an application (such as a mobile application), upon a user opening the mobile application, or other user interaction with the application. In other examples, the interaction client initiates the method at operation 404 based on other factors, such as a chat message or other interaction (or historical interaction) between the user and other users, such as not having any unread messages.

The method includes accessing one or more augmentation trigger criteria at operation 404. Augmentation trigger criteria includes logic that is applied to data associated with the first user, a second user, and/or other users. Examples include a birthday of the second user, a change to a particular aspect of the second user's profile, or a post from the second user. In some examples, the augmentation trigger criteria includes logic that is applied to other types of data, such as a time of the day, a day of the week, a day of the month, or a holiday. Table 1 below illustrates a non-exclusive listing of augmentation trigger criteria examples and corresponding logic:

TABLE 1

Augmented Trigger Examples

| Event | Logic |
| --- | --- |
| Friend's Birthday | Matching a current date with a birthday of a friend: matched to content augmentation related to birthdays |
| New Friend in the feed | Recently added friend to user profile: matched to content augmentation related to welcoming others |
| New Group created | Recently created group: matched to content augmentation related to profile data of multiple users in the group |
| Pinned someone to feed | Friend pins first user in a post or feed in the past 24 hours: matched to content augmentation related to content of the post or feed |
| Missed a call | When user misses a call: matched to content augmentation related to historical content for and/or with the caller |
| Played a game with someone | In-game or played game in the past with user: matched to content augmentation related to the game or contextual information from interactions within the game |
| Friend made a screenshot | When a friend takes a screenshot: matched to content augmentation related to screenshots and/or content within the screenshot |

TABLE 1-continued

Augmented Trigger Examples

| Event | Logic |
| --- | --- |
| Watched Friend's post in the feed | After watching a friend's post in a feed: matched to content augmentation related to content within the feed or between the friend and user |
| Mutual friends | Finding mutual friends: matched to content augmentation related to the mutual friend |
| Time of day-morning, evening, night | Local time of day: matched to content augmentation related to Morning/Midday/Evening |
| Holidays | Holidays from a friend's associated locations (current, birth, historical locations): matched to content augmentation related to holidays of these locations |
| Friend changed profile outfit | Friend changed profile outfit in the past 24 hours: matched to content augmentation related to profile outfits |
| Mentioned in a friend's post | A friend mentioned user in their posts: matched to content augmentation related to existing chat between the users |
| successful call | After a successful call: matched to content augmentation related to conversations and/or contextual data on historical communications |
| Friend saved a message or post | When a friend saved a new message: matched to content augmentation related to the message or post |
| Chat reply | Received a message from a friend: matched to content augmentation related to conversation replies and/or the context in the chat |
| Streak | When there is a streak with a friend: matched to content augmentation related to the particular streak (e.g., streak of messages or posts between users) |

The method includes applying the one or more augmentation trigger criteria to user profile data corresponding to one or more users, such as the first user or a second user, of the interaction system at operation 406, and determining that a second user of the other users meet a trigger criterion of the one or more augmentation trigger criteria at operation 408. The interaction system determines whether users meet trigger criterions based on the application of the one or more augmentation trigger criteria to the user profile data. The user profile data is profile data for a current user using the application, friends or other users that are linked with the current user, or other users of the interaction system. In some examples, the interaction system identifies a birthday of a second user and determines whether the second user's birthday matches the current date or an upcoming date to determine whether the birthday trigger criterion has been met.

The method includes identifying at least one recommended content augmentation associated with the trigger criterion at operation 410. Augmentation trigger criteria are mapped to one or more content augmentations. For a particular trigger criterion, the interaction system accesses the mapping to identify a set of content augmentations to recommend. In other examples, the interaction system applies a machine learning model trained to identify relevant content augmentations based on the type of trigger criterion. Some examples include a machine learning model that identifies relevant content augmentations for a single trigger or for multiple triggers. In some examples, the machine learning model can identify the most relevant content augmentations for a birthday trigger. In some embodiments, machine learning model receives as input additional information such as context of interactions between users, user profile data, and/or the like to further narrow the recommended content augmentations.

The interaction system identifies that the user profile data meets one or more trigger criteria. The interaction system selects one of the plurality of trigger criteria to recommend content augmentations. The trigger criteria are associated with priority values, such as a higher priority for birthdays than missed calls. In other examples, the interaction system applies the trigger criterion that applies more recent user profile data. In other examples, the interaction system applies a weighting, such as a weighting for particular trigger criteria, data applied for the trigger criteria, historical use of trigger criteria for the first or second user, and/or the like. In some examples, the interaction system assesses a plurality of user profiles to determine whether a particular trigger criterion is met. For example, the trigger criterion can require that the first and second user include a particular value in their profile, such as being in the same location.

In some examples, the interaction system further reduces the set of recommended content augmentations. The interaction system initially identifies a recommended set of content augmentations based on the trigger criterion. The interaction system then identifies a subset of the mapped set of content augmentations by determining a preference of a type of content augmentation for the first user or other users based on historical selections of content augmentations by the first user or other users.

The method includes causing display of a first selectable user interface element associated with the at least one recommended content augmentation with the listing of other users on the user interface at block 412. In some examples, the interaction system displays the first selectable user interface element adjacent to an identifier or the name of the second user.

The interaction system displays the listing of other users where users are placed in individual user interface cells. The interaction system displays the first selectable user interface element (e.g., a selectable icon representing the recommended content augmentations) within the user interface cell for the second user.

In some examples, the interaction system allows efficient use of the user interface, reducing the number of graphical user interfaces needed to send video or image with content augmentation to a particular user. In traditional augmentation processes, a user identifies something related to a friend, such as from a third party application, opens a mobile application for the interaction system, selects the option to open a camera, searches for a particular content augmentation from a complete database of content augmentations based on a search query, records a video or image with the content augmentation applied, saves the recording locally onto an interaction client, opens a messaging application, finds the friend on the messaging application, opens a chat window with the friend, and finally attaches the locally saved video or image to send to the second user. In stark contrast, the interaction system automatically retrieves user profile data to apply to trigger criteria that are mapped to relevant content augmentations. Moreover, the interaction client displays a selectable icon for the user to directly access the content augmentations right on the list of users.

In some examples, other users that are associated with the user (such as within an interaction function of the interactive system) include followers or friends, where users can follow or be followed by others, or form some form of relationship such that other users can see certain information, such as each other's posts on their feeds. In some examples, the other users can include "close" or "best" friends that can create a relationship to share additional information not available to others, such as private posts, targeted sharing of content, and/or the like. In some examples, other users are users mentioned or tagged in the user's posts, comments, chat messages, or other communication that draws the attention of the tagged user and/or can initiate conversations or discussions. In some examples, other users are users that are involved in a message chat with the user, such as a private messaging feature that allows users to send messages directly to one another or group chats among many users. In some examples, other users are users that joined a group based on shared interests or common goals. Within these groups, users can interact and form relationships based on the group's focus and/or share information among group members. In some examples, other users are users who express support for users, such as through likes, comments, or shares. In some examples, other users are influencers or brand ambassadors that have established large followings and are seen as authorities or trendsetters in their niches. In some examples, other users are collaborators working together on projects or create content together.

Advantageously, the interaction system according to some examples provides a practical solution to a technical problem of limited user interface real estate, complex navigation in a user interface, or both. The interaction system automatically identifies relevant context augmentations using user profile data and displays options to access such recommended context augmentations right on the listing of users. The icon enables a user to directly access a camera feed with a context augmentation applied, and enables the user to record and send a picture or video directly to the friend that the context augmentation is recommended for. Moreover, given the limited user interface real estate with at least some current technology, the interaction system may display an icon within the same cell of the friend to access recommended content augmentations. Thus, the technical problem of navigating through numerous graphical user interfaces to send an augmented picture or video may be solved by the practical solution of automatically applying user profile data to augmentation trigger criteria.

In some examples, the interaction system determines a number of recommended context augmentations to display based on a characteristic of the interaction client that the user is using. The interaction system can limit a number of recommendation context augmentations to display based on screen size. In some examples, the interaction system varies the number based on whether the interaction client is a mobile device or a laptop screen, or a screen size for different mobile devices.

In some examples, the interaction system removes the display of the first selectable user interface element in response to a lapse of a predetermined time period and/or upon use of a recommended content augmentation. The predetermined time period is associated with the trigger criterion. In some examples, a birthday trigger criterion expires in 24 hours, whereas a missed call trigger expires after 2 days. In some examples, if the trigger is still active but the user navigates to a chat window with the user and sends a message without selecting the first selectable user interface element, the interaction system clears the trigger and does not show the first selectable user interface element going forward for the particular trigger criterion.

Still referring to FIG. 4, the method includes receiving a user selection of the first selectable user interface element and displaying the recommended content augmentations on the user interface at operation 414. The user interface includes another user selectable interface element enabling the user to scroll through multiple recommended content augmentations.

The interaction system displays the recommended content augmentations such that a certain number of impression limits for each recommended content augmentation is set, such as set to 5 or 10. In other examples, the interaction system dynamically adjusts the impression limits based on conversion rates (e.g., rate at which a content augmentation was displayed and selected) for the first user, for the second user, for a general population, and/or for a subset of the population (e.g., users in a similar time zone, location, age range, ethnicity, education, occupation, marital status, income, and/or the like).

The method includes applying the content augmentation to a camera feed from a camera system at operation 416, capturing an image or video from the camera stream at operation 418, and sending the image or video to the second user at operation 420. According to some examples, the interaction system applies a birthday content augmentation to a camera feed of the first user, captures a video where the camera feed of the first user is modified to include a birthday hat and balloons in the background, and sends the captured video to a second user on the second user's birthday.

Figure 5:
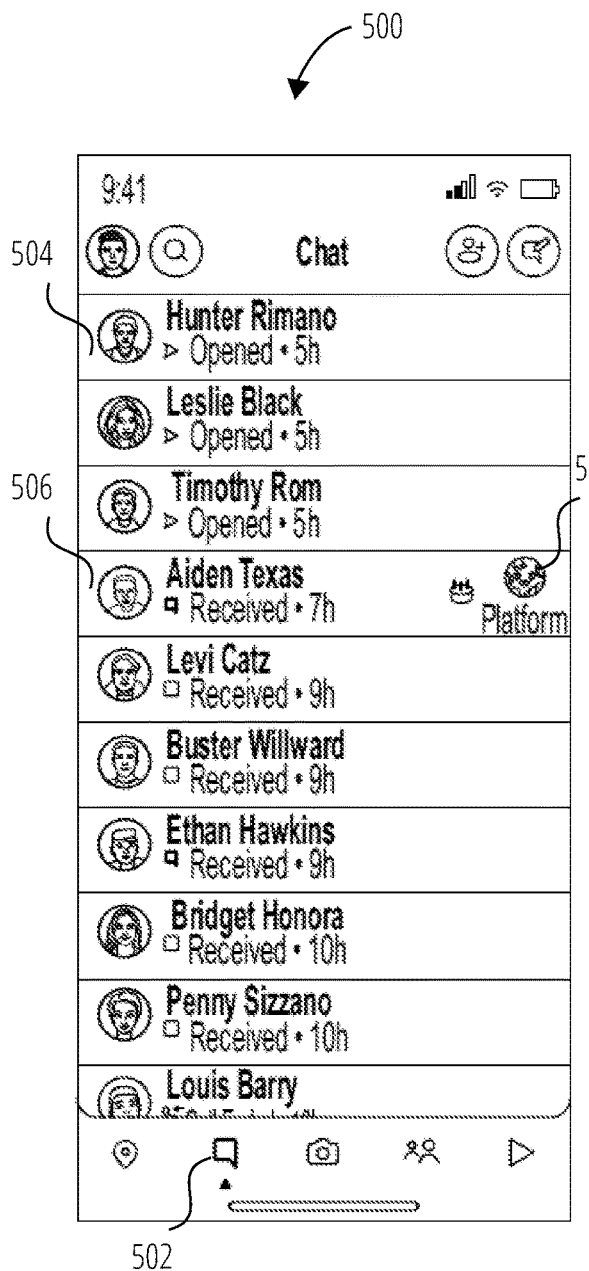
FIG. 5 is a user interface diagram showing a listing of users and an icon representing recommended content augmentations for a particular user on the list, according to some examples.

FIG. 5 is a user interface diagram 500 showing a listing of other users and an icon representing recommended content augmentation for a particular user on the list, according to some examples. The listing of other users (e.g., friends of the user) is a listing of historical chats with those individual users. The user interface is displayed on an interaction client of a first user. The first user selects a selectable user interface element 502 to see a listing of historical chats 504.

The interaction client retrieves profiles for one or more individuals that are listed in the history of chats. In some examples, referring to the interaction client 104 and the user management system 218, the interaction client accesses augmentation trigger criterion from the user management system to determine whether any of the individuals on the list meet the augmentation trigger criterion. The interaction client identifies a second user 506 with profile data that meet the birthday trigger criterion. In some examples, the trigger criterion includes checking whether a user's birthday matches the current date. The interaction client then adds a selectable user interface element (a birthday icon) 508 adjacent to the second user on the list.

The interaction client displays user interface cells for the listing of users, where each user that is being displayed is assigned to a particular user interface cell. The user interface cell for the second user 506 includes a profile image or animated character of the second user, the name of the second user, the last communication with the user (e.g., call received 7 hours ago), and a first selectable user interface element 508 representing a birthday icon.

Figure 6:
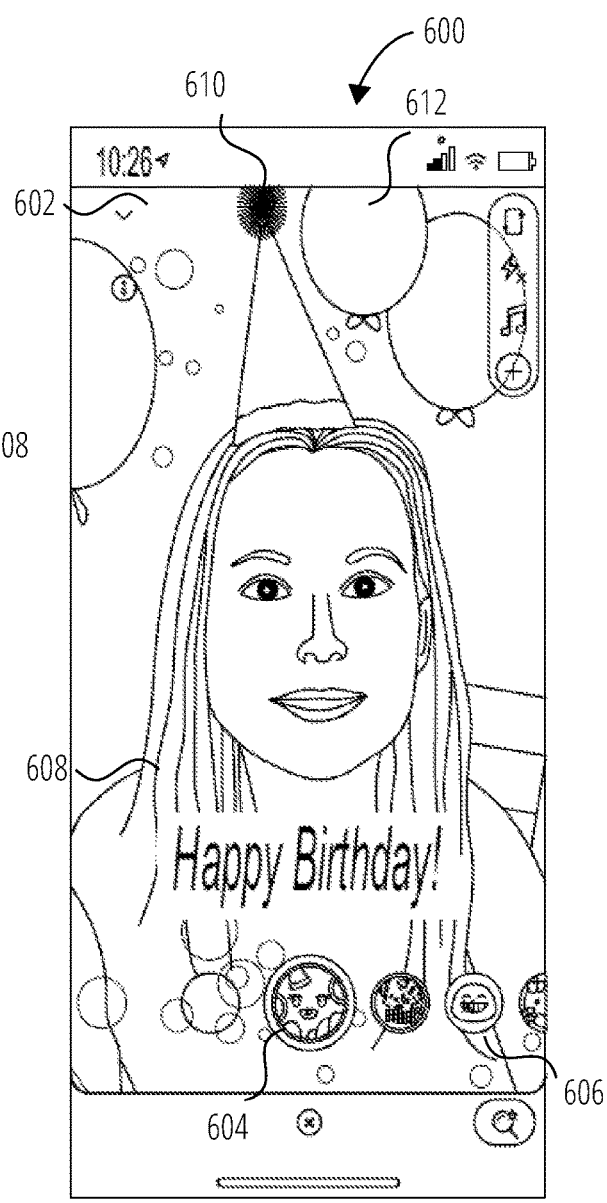
FIG. 6 is a user interface diagram showing a selected content augmentation applied to a real-time camera feed of a camera system, according to some examples.

FIG. 6 is a user interface diagram 600 showing a selected content augmentation applied to a real-time video feed of (e.g., content captured by) a camera system, according to some examples. The interaction client receives a user selection of the selectable user interface element 508 of FIG. 5, indicating that the first user desires to send a message with a content augmentation to the second user.

In response to the user selection, the interaction client identifies a set of content augmentations relevant to the trigger criterion for the second user by accessing a mapping of content augmentations to augmentation trigger criterion. The interaction client initiates opening of the camera system to capture the real-time video feed 602 and displays the real-time video feed 602 on a user interface of the interaction client.

The interaction client applies a first content augmentation 604 upon opening of the camera system. In some examples, the interaction client automatically applies or preselects the first content augmentation 604 based on identifying the content augmentation as the most relevant for the context. The first user has the option to scroll through the other content augmentations in the set of recommended content augmentations, such as a second content augmentation 606. The interaction system actively applies the first content augmentation 604 to the real-time video feed 602 by displaying, on the user interface, the first user 608 and digital items that are overlaying, modifying, or otherwise augmenting the real-time video feed 602, such as a birthday hat 610 on the head of the first user and balloons 612 in the background of the first user.

The first user selects to capture a video or picture of the real-time video feed 602 modified with the digital items to send to the second user to wish the second user a happy birthday.

Recommending Content Augmentations Based on Chat Messages

Figure 7:
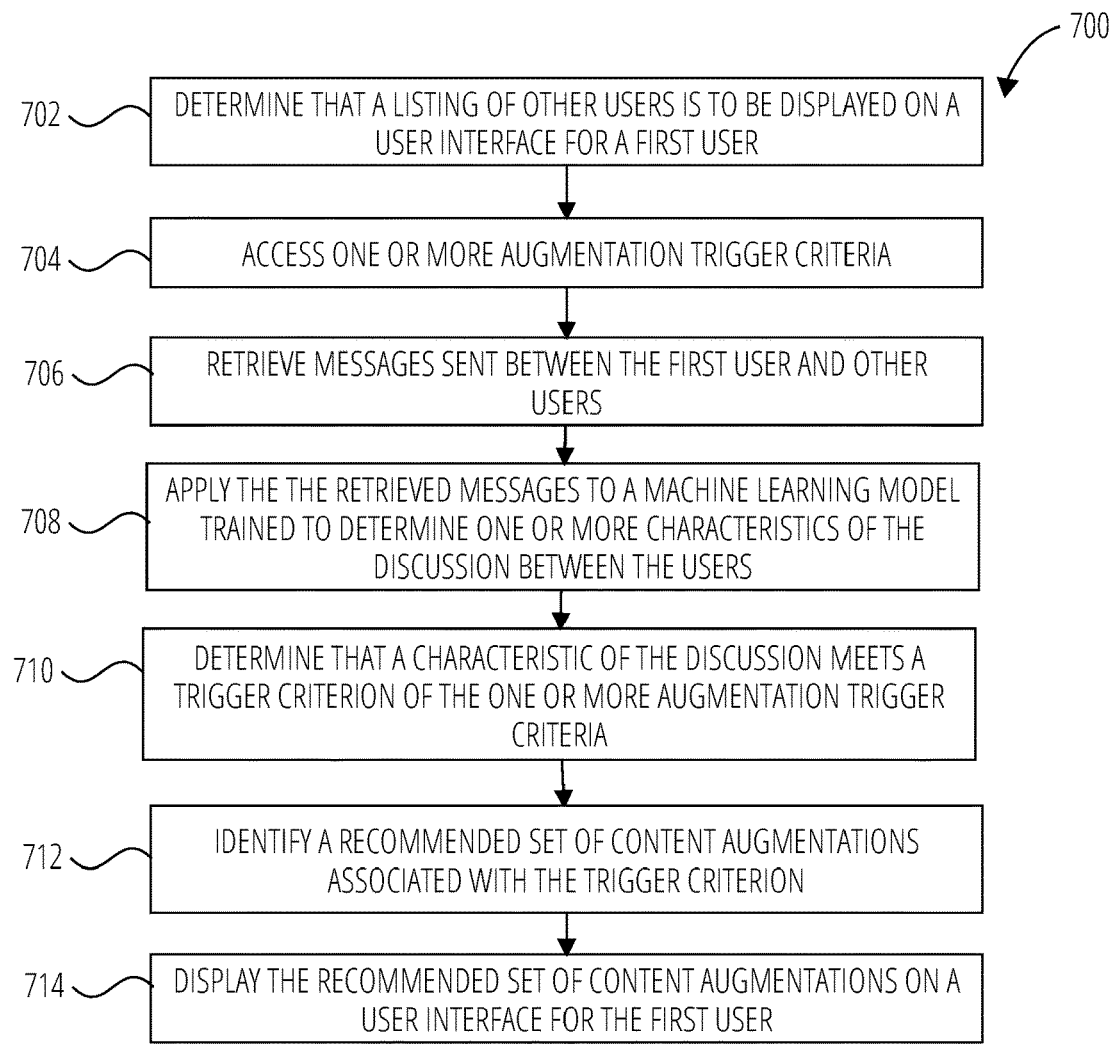
FIG. 7 illustrates a flowchart for recommending content augmentations based on contextual information from messages exchanged between users, according to some examples.

FIG. 7 illustrates a method 700 for recommending content augmentations based on contextual information from messages exchanged between users, according to some examples. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

The method includes determining that a listing of other users is to be displayed on a user interface for a first user at operation 702 (such as a list of historical chat messages with other users) and accessing one or more augmentation trigger criteria at operation 704.

The method includes retrieving messages sent between the first user and other users at operation 706 and applying the retrieved messages to a machine learning model trained to determine one or more characteristics of the discussion between the users at operation 708. The interaction system inputs all or a subset of the messages sent between the first user and the other users in the chat. The interaction system inputs a subset of messages based on a number of messages, a certain time period when the messages were sent, a certain keyword or phrase used, messages sent by the sender or recipient, hashtags used, and/or the like.

The interaction system receives contextual information from the machine learning model. According to some examples, the user is recommending certain restaurants to go to with the other user for their trip to California. The machine learning module outputs "restaurants" as the topic of discussion. In some examples, the machine learning model outputs more than one output, such as "restaurants," "travel," and "California." Multiple outputs are used to narrow to a more relevant trigger criterion. In some examples, multiple outputs are used to identify more than one relevant trigger criteria.

The method includes determining that a characteristic of the discussion meets a trigger criterion of the one or more augmentation trigger criteria at operation 710 and identifies a recommended set of content augmentations associated with the trigger criterion at operation 712. The interaction system determines that the "restaurants" context matches a trigger criterion for food and identifies content augmentations that augments a camera feed with digital items related to certain types of food. The method includes displaying the recommended set of content augmentations on a user interface for the first user at operation 714.

The machine learning model is stored and applied on the interaction client whereas the machine learning model is trained by the interaction servers. In other examples, the machine learning model is applied and/or trained in other systems of the interaction system.

Figure 8:
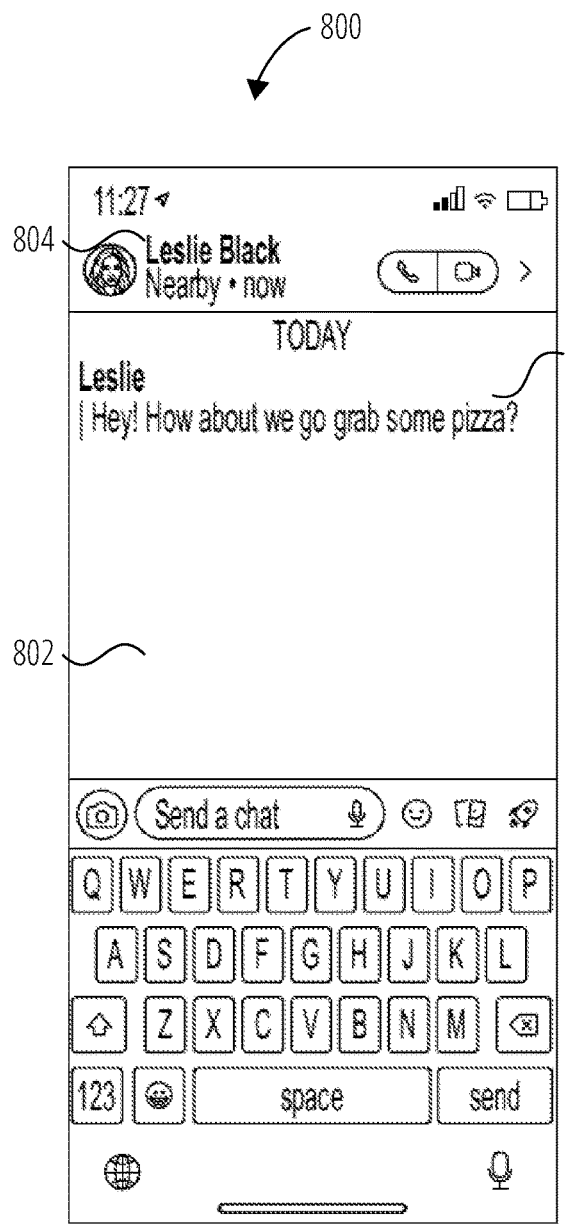
FIG. 8 is a user interface diagram showing a chat window between a first user and a second user, according to some examples.

FIG. 8 is a user interface diagram 800 showing a chat window 802 between a first user and a second user, according to some examples. The first user and the second user 804 exchanges messages within this chat window 802. For example, the second user asks "Hey! How about we go grab some pizza?" 806.

The interaction client of the first user assesses context of the discussion to determine whether recommended content augmentations should be presented. The interaction client inputs text from the chat window to a machine learning model that is trained to identify characteristics in the text between the users, such as the topic of discussion. The machine learning model identifies that the topic of discussion between the user of the interaction client and the second user 804 is pizza.

The interaction client accesses augmentation trigger criterion to determine whether the characteristic of the discussion identified by the machine learning model meets augmentation trigger criterion. The interaction client identifies that the topic of discussion meets a particular trigger criterion (e.g., the pizza trigger criterion).

Figure 9:
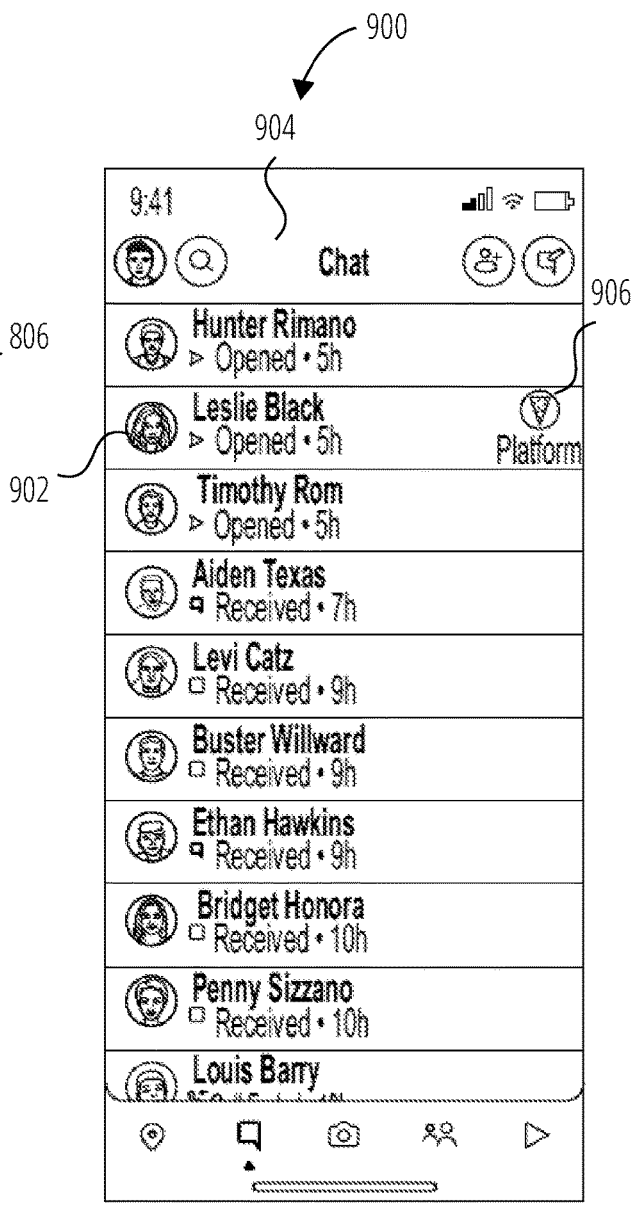
FIG. 9 is a user interface diagram showing a listing of other users and an icon representing recommended content augmentations relevant to a characteristic of the conversation between the two users, according to some examples.

FIG. 9 is an example user interface diagram 900 showing a listing of other users 904 and an icon representing recommended content augmentations relevant to a characteristic of the conversation between the two users. The interaction client adds a selectable user interface element (a pizza icon) 906 adjacent to the second user 902 on the list based on applying augmentation trigger criterion to the output of the machine learning model.

In response to a user selection of the user interface element, the interaction client opens the camera system while applying a first content augmentation, where the first user has the option to scroll through the other content augmentations in the set of recommended content augmentations, capture a video or picture of the real-time video feed modified with the digital items, and send to the second user the video or picture relevant to a characteristic (such as a topic of discussion) between the two users.

Data Communications Architecture

Figure 10:
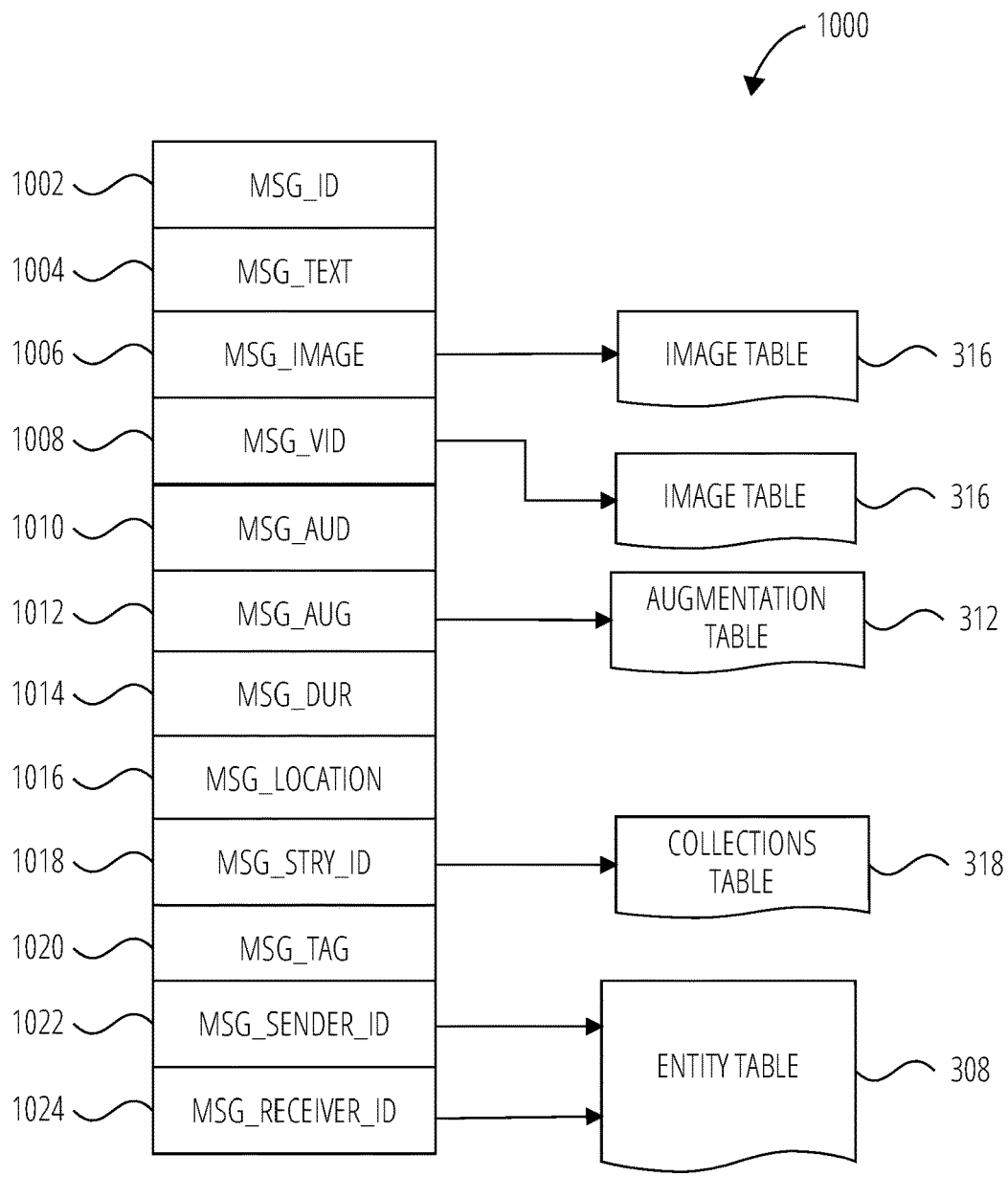
FIG. 10 is a diagrammatic representation of a message, according to some examples.

FIG. 10 is a schematic diagram illustrating a structure of a message 1000, according to some examples, generated by an interaction client 104 for communication to a further interaction client 104 via the interaction servers 124. The content of a particular message 1000 is used to populate the message table 306 stored within the database 304, accessible by the interaction servers 124. Similarly, the content of a message 1000 is stored in memory as "in-transit" or "in-flight" data of the user system 102 or the interaction servers 124. A message 1000 is shown to include the following example components:

Message identifier 1002: a unique identifier that identifies the message 1000.

Message text payload 1004: text, to be generated by a user via a user interface of the user system 102, and that is included in the message 1000.

Message image payload 1006: image data, captured by a camera component of a user system 102 or retrieved from a memory component of a user system 102, and that is included in the message 1000. Image data for a sent or received message 1000 may be stored in the image table 316.

Message video payload 1008: video data, captured by a camera component or retrieved from a memory component of the user system 102, and that is included in the message 1000. Video data for a sent or received message 1000 may be stored in the image table 316.

Message audio payload 1010: audio data, captured by a microphone or retrieved from a memory component of the user system 102, and that is included in the message 1000.

Message augmentation data 1012: augmentation data (e.g., filters, stickers, or other annotations or enhancements) that represents augmentations to be applied to message image payload 1006, message video payload 1008, or message audio payload 1010 of the message 1000. Augmentation data for a sent or received message 1000 may be stored in the augmentation table 312.

Message duration parameter 1014: parameter value indicating, in seconds, the amount of time for which content of the message (e.g., the message image payload 1006, message video payload 1008, message audio payload 1010) is to be presented or made accessible to a user via the interaction client 104.

Message geolocation parameter 1016: geolocation data (e.g., latitudinal and longitudinal coordinates) associated with the content payload of the message. Multiple message geolocation parameter 1016 values may be included in the payload, each of these parameter values being associated with respect to content items included in the content (e.g., a specific image within the message image payload 1006, or a specific video in the message video payload 1008).

Message story identifier 1018: identifier values identifying one or more content collections (e.g., "stories" identified in the collections table 318) with which a particular content item in the message image payload 1006 of the message 1000 is associated. For example, multiple images within the message image payload 1006 may each be associated with multiple content collections using identifier values.

Message tag 1020: each message 1000 may be tagged with multiple tags, each of which is indicative of the subject matter of content included in the message payload. For example, where a particular image included in the message image payload 1006 depicts an animal (e.g., a lion), a tag value may be included within the message tag 1020 that is indicative of the relevant animal. Tag values may be generated manually, based on user input, or may be automatically generated using, for example, image recognition.

Message sender identifier 1022: an identifier (e.g., a messaging system identifier, email address, or device identifier) indicative of a user of the user system 102 on which the message 1000 was generated and from which the message 1000 was sent.

Message receiver identifier 1024: an identifier (e.g., a messaging system identifier, email address, or device identifier) indicative of a user of the user system 102 to which the message 1000 is addressed.

The contents (e.g., values) of the various components of message 1000 may be pointers to locations in tables within which content data values are stored. For example, an image value in the message image payload 1006 may be a pointer to (or address of) a location within an image table 316. Similarly, values within the message video payload 1008 may point to data stored within an image or video table 316, values stored within the message augmentation data 1012 may point to data stored in an augmentation table 312, values stored within the message story identifier 1018 may point to data stored in a collections table 318, and values stored within the message sender identifier 1022 and the message receiver identifier 1024 may point to user records stored within an entity table 308.

System with Head-Wearable Apparatus

Figure 11:
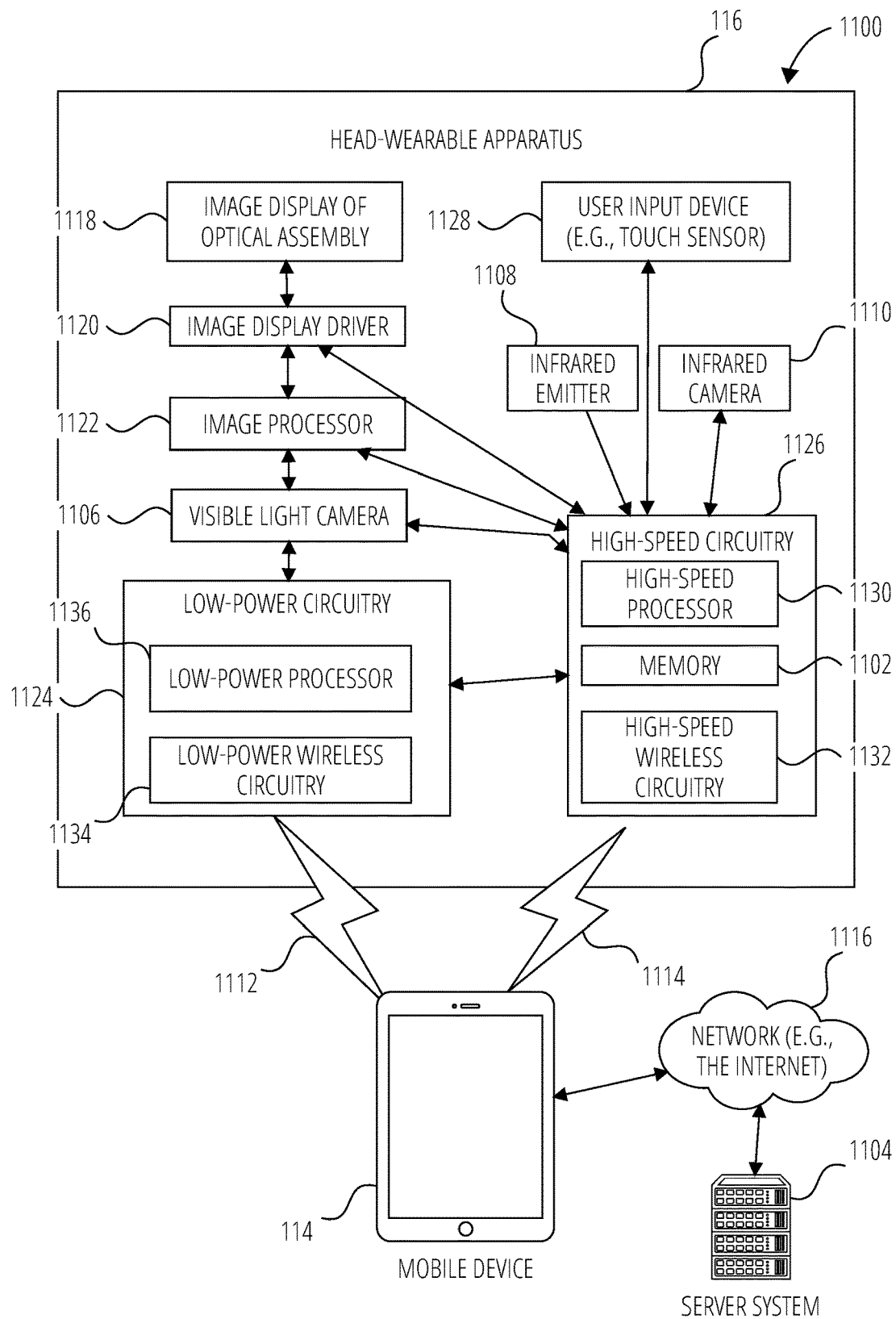
FIG. 11 illustrates a system including a head-wearable apparatus, according to some examples.

FIG. 11 illustrates a system 1100 including a head-wearable apparatus 116 with a selector input device, according to some examples. FIG. 11 is a high-level functional block diagram of an example head-wearable apparatus 116 communicatively coupled to a mobile device 114 and various server systems 1104 (e.g., the interaction server system 110) via various networks 108. The networks 108 may include any combination of wired and wireless connections.

The head-wearable apparatus 116 includes one or more cameras, each of which may be, for example, a visible light camera 1106, an infrared emitter 1108, and an infrared camera 1110.

An interaction client, such as a mobile device 114 connects with head-wearable apparatus 116 using both a low-power wireless connection 1112 and a high-speed wireless connection 1114. The mobile device 114 is also connected to the server system 1104 and the network 1116.

The head-wearable apparatus 116 further includes two image displays of the image display of optical assembly 1118. The two image displays of optical assembly 1118 include one associated with the left lateral side and one associated with the right lateral side of the head-wearable apparatus 116. The head-wearable apparatus 116 also includes an image display driver 1120, an image processor 1122, low-power circuitry 1124, and high-speed circuitry 1126. The image display of optical assembly 1118 is for presenting images and videos, including an image that can include a graphical user interface to a user of the head-wearable apparatus 116.

The image display driver 1120 commands and controls the image display of optical assembly 1118. The image display driver 1120 may deliver image data directly to the image display of optical assembly 1118 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1128 (e.g., touch sensor or push button), including an input surface on the head-wearable apparatus 116. The user input device 1128 (e.g., touch sensor or push button) is to receive from the user an input selection to manipulate the graphical user interface of the presented image.

The components shown in FIG. 11 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1106 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1102, which stores instructions to perform a subset or all of the functions described herein. The memory 1102 can also include storage device.

As shown in FIG. 11, the high-speed circuitry 1126 includes a high-speed processor 1130, a memory 1102, and high-speed wireless circuitry 1132. In some examples, the image display driver 1120 is coupled to the high-speed circuitry 1126 and operated by the high-speed processor 1130 in order to drive the left and right image displays of the image display of optical assembly 1118. The high-speed processor 1130 may be any processor capable of managing high-speed communications and operation of any general computing system needed for the head-wearable apparatus 116. The high-speed processor 1130 includes processing resources needed for managing high-speed data transfers on a high-speed wireless connection 1114 to a wireless local area network (WLAN) using the high-speed wireless circuitry 1132. In certain examples, the high-speed processor 1130 executes an operating system such as a LINUX operating system or other such operating system of the head-wearable apparatus 116, and the operating system is stored in the memory 1102 for execution. In addition to any other responsibilities, the high-speed processor 1130 executing a software architecture for the head-wearable apparatus 116 is used to manage data transfers with high-speed wireless circuitry 1132. In certain examples, the high-speed wireless circuitry 1132 is configured to implement Institute of Electrical and Electronic Engineers (IEEE) 802.11 communication standards, also referred to herein as WI-FI®. In some examples, other high-speed communications standards may be implemented by the high-speed wireless circuitry 1132.

The low-power wireless circuitry 1134 and the high-speed wireless circuitry 1132 of the head-wearable apparatus 116 can include short-range transceivers (Bluetooth™) and wireless wide, local, or wide area network transceivers (e.g., cellular or WI-FI®). Mobile device 114, including the transceivers communicating via the low-power wireless connection 1112 and the high-speed wireless connection 1114, may be implemented using details of the architecture of the head-wearable apparatus 116, as can other elements of the network 1116.

The memory 1102 includes any storage device capable of storing various data and applications, including, among other things, camera data generated by the left and right visible light cameras 1106, the infrared camera 1110, and the image processor 1122, as well as images generated for display by the image display driver 1120 on the image displays of the image display of optical assembly 1118. While the memory 1102 is shown as integrated with high-speed circuitry 1126, in some examples, the memory 1102 may be an independent standalone element of the head-wearable apparatus 116. In certain such examples, electrical routing lines may provide a connection through a chip that includes the high-speed processor 1130 from the image processor 1122 or the low-power processor 1136 to the memory 1102. In some examples, the high-speed processor 1130 may manage addressing of the memory 1102 such that the low-power processor 1136 will boot the high-speed processor 1130 any time that a read or write operation involving memory 1102 is needed.

As shown in FIG. 11, the low-power processor 1136 or high-speed processor 1130 of the head-wearable apparatus 116 can be coupled to the camera (visible light camera 1106, infrared emitter 1108, or infrared camera 1110), the image display driver 1120, the user input device 1128 (e.g., touch sensor or push button), and the memory 1102.

The head-wearable apparatus 116 is connected to a host computer. For example, the head-wearable apparatus 116 is paired with the mobile device 114 via the high-speed wireless connection 1114 or connected to the server system 1104 via the network 1116. The server system 1104 may be one or more computing devices as part of a service or network computing system, for example, that includes a processor, a memory, and network communication interface to communicate over the network 1116 with the mobile device 114 and the head-wearable apparatus 116.

The mobile device 114 includes a processor and a network communication interface coupled to the processor. The network communication interface allows for communication over the network 1116, low-power wireless connection 1112, or high-speed wireless connection 1114. Mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 1120. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1104, such as the user input device 1128, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1112 and high-speed wireless connection 1114 from the mobile device 114 via the low-power wireless circuitry 1134 or high-speed wireless circuitry 1132.

Machine Architecture

Figure 12:
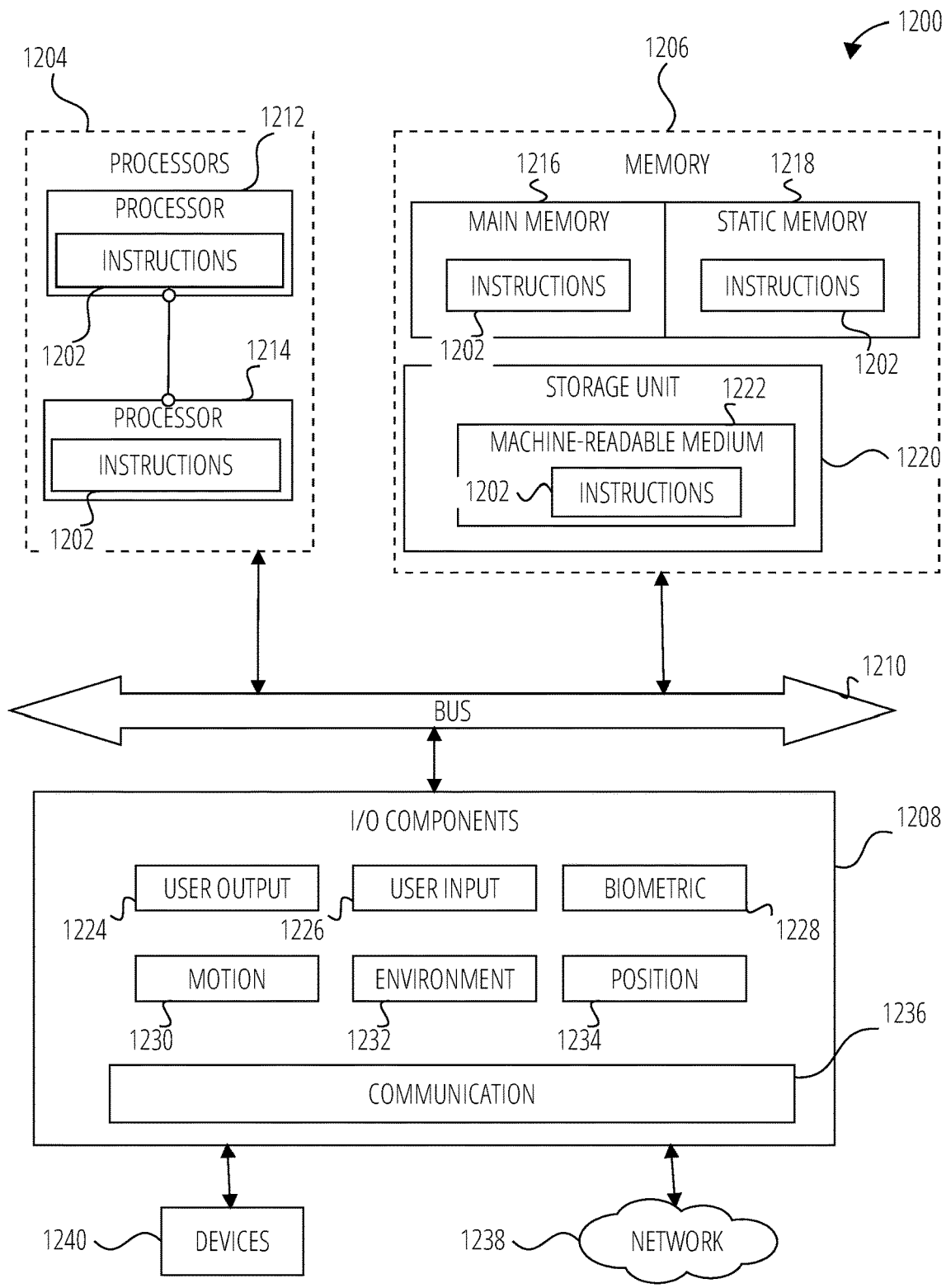
FIG. 12 is a diagrammatic representation of a machine in the form of a computer system within which a set of instructions may be executed to cause the machine to perform any one or more of the methodologies discussed herein, according to some examples.

FIG. 12 is a diagrammatic representation of the machine 1200 within which instructions 1202 (e.g., software, a program, an application, an applet, an app, or other executable code) for causing the machine 1200 to perform any one or more of the methodologies discussed herein may be executed. For example, the instructions 1202 may cause the machine 1200 to execute any one or more of the methods described herein. The instructions 1202 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1202, sequentially or otherwise, that specify actions to be taken by the machine 1200. Further, while a single machine 1200 is illustrated, the term "machine" shall also be taken to include a collection of machines that individually or jointly execute the instructions 1202 to perform any one or more of the methodologies discussed herein. The machine 1200, for example, may comprise the user system 102 or any one of multiple server devices forming part of the interaction server system 110. In some examples, the machine 1200 may also comprise both client and server systems, with certain operations of a particular method or algorithm being performed on the server-side and with certain operations of the particular method or algorithm being performed on the client-side.

The machine 1200 may include processors 1204, memory 1206, and input/output I/O components 1208, which may be configured to communicate with each other via a bus 1210. In an example, the processors 1204 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1212 and a processor 1214 that execute the instructions 1202. The term "processor" is intended to include multi-core processors that may comprise two or more independent processors (sometimes referred to as "cores") that may execute instructions contemporaneously. Although FIG. 12 shows multiple processors 1204, the machine 1200 may include a single processor with a single-core, a single processor with multiple cores (e.g., a multi-core processor), multiple processors with a single core, multiple processors with multiples cores, or any combination thereof.

The memory 1206 includes a main memory 1216, a static memory 1218, and a storage unit 1220, both accessible to the processors 1204 via the bus 1210. The main memory 1206, the static memory 1218, and storage unit 1220 store the instructions 1202 embodying any one or more of the methodologies or functions described herein. The instructions 1202 may also reside, completely or partially, within the main memory 1216, within the static memory 1218, within machine-readable medium 1222 within the storage unit 1220, within at least one of the processors 1204 (e.g., within the processor's cache memory), or any suitable combination thereof, during execution thereof by the machine 1200.

The I/O components 1208 may include a wide variety of components to receive input, provide output, produce output, transmit information, exchange information, capture measurements, and so on. The specific I/O components 1208 that are included in a particular machine will depend on the type of machine. For example, portable machines such as mobile phones may include a touch input device or other such input mechanisms, while a headless server machine will likely not include such a touch input device. It will be appreciated that the I/O components 1208 may include many other components that are not shown in FIG. 12. In various examples, the I/O components 1208 may include user output components 1224 and user input components 1226. The user output components 1224 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1226 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1208 may include biometric components 1228, motion components 1230, environmental components 1232, or position components 1234, among a wide array of other components. For example, the biometric components 1228 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like.

The motion components 1230 include acceleration sensor components (e.g., accelerometer), gravitation sensor components, and rotation sensor components (e.g., gyroscope).

The environmental components 1232 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1234 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1208 further include communication components 1236 operable to couple the machine 1200 to a network 1238 or devices 1240 via respective coupling or connections. For example, the communication components 1236 may include a network interface component or another suitable device to interface with the network 1238. In further examples, the communication components 1236 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1240 may be another machine or any of a wide variety of peripheral devices (e.g., a peripheral device coupled via a USB).

Moreover, the communication components 1236 may detect identifiers or include components operable to detect identifiers. For example, the communication components 1236 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1236, such as location via Internet Protocol (IP) geolocation, location via Wi-Fi® signal triangulation, location via detecting an NFC beacon signal that may indicate a particular location, and so forth.

The various memories (e.g., main memory 1216, static memory 1218, and memory of the processors 1204) and storage unit 1220 may store one or more sets of instructions and data structures (e.g., software) embodying or used by any one or more of the methodologies or functions described herein. These instructions (e.g., the instructions 1202), when executed by processors 1204, cause various operations to implement the disclosed examples.

The instructions 1202 may be transmitted or received over the network 1238, using a transmission medium, via a network interface device (e.g., a network interface component included in the communication components 1236) and using any one of several well-known transfer protocols (e.g., hypertext transfer protocol (HTTP)). Similarly, the instructions 1202 may be transmitted or received using a transmission medium via a coupling (e.g., a peer-to-peer coupling) to the devices 1240.

Software Architecture

Figure 13:
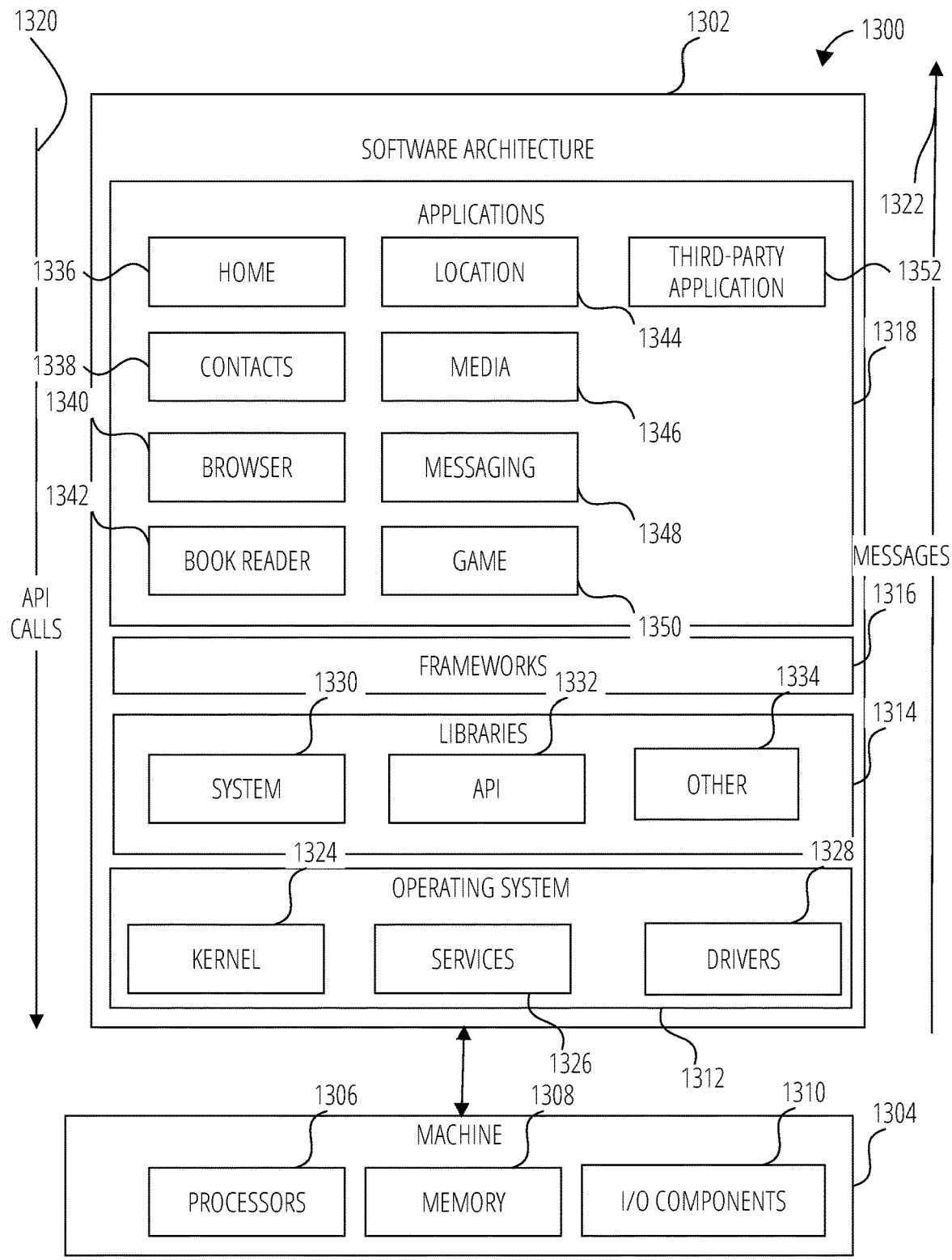
FIG. 13 is a block diagram showing a software architecture within which examples may be implemented.

FIG. 13 is a block diagram 1300 illustrating a software architecture 1302, which can be installed on any one or more of the devices described herein. The software architecture 1302 is supported by hardware such as a machine 1304 that includes processors 1306, memory 1308, and I/O components 1310. In this example, the software architecture 1302 can be conceptualized as a stack of layers, where each layer provides a particular functionality. The software architecture 1302 includes layers such as an operating system 1312, libraries 1314, frameworks 1316, and applications 1318. Operationally, the applications 1318 invoke API calls 1320 through the software stack and receive messages 1322 in response to the API calls 1320.

The operating system 1312 manages hardware resources and provides common services. The operating system 1312 includes, for example, a kernel 1324, services 1326, and drivers 1328. The kernel 1324 acts as an abstraction layer between the hardware and the other software layers. For example, the kernel 1324 provides memory management, processor management (e.g., scheduling), component management, networking, and security settings, among other functionalities. The services 1326 can provide other common services for the other software layers. The drivers 1328 are responsible for controlling or interfacing with the underlying hardware. For instance, the drivers 1328 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1314 provide a common low-level infrastructure used by the applications 1318. The libraries 1314 can include system libraries 1330 (e.g., C standard library) that provide functions such as memory allocation functions, string manipulation functions, mathematic functions, and the like. In addition, the libraries 1314 can include API libraries 1332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1314 can also include a wide variety of other libraries 1334 to provide many other APIs to the applications 1318.

The frameworks 1316 provide a common high-level infrastructure that is used by the applications 1318. For example, the frameworks 1316 provide various graphical user interface (GUI) functions, high-level resource management, and high-level location services. The frameworks 1316 can provide a broad spectrum of other APIs that can be used by the applications 1318, some of which may be specific to a particular operating system or platform.

In an example, the applications 1318 may include a home application 1336, a contacts application 1338, a browser application 1340, a book reader application 1342, a location application 1344, a media application 1346, a messaging application 1348, a game application 1350, and a broad assortment of other applications such as a third-party application 1352. The applications 1318 are programs that execute functions defined in the programs. Various programming languages can be employed to create one or more of the applications 1318, structured in a variety of manners, such as object-oriented programming languages (e.g., Objective-C, Java, or C++) or procedural programming languages (e.g., C or assembly language). In a specific example, the third-party application 1352 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1352 can invoke the API calls 1320 provided by the operating system 1312 to facilitate functionalities described herein.

Figure 14:
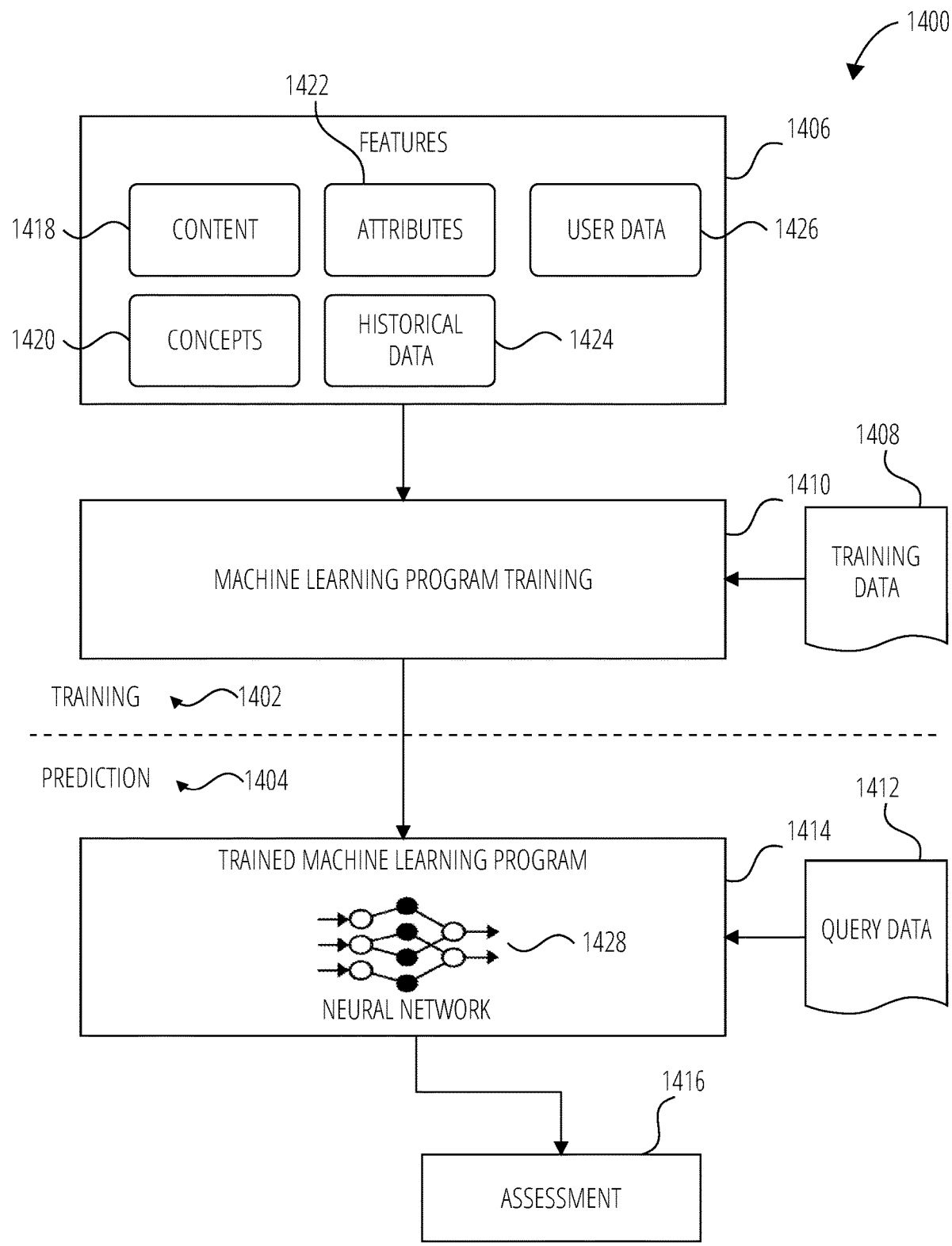
FIG. 14 illustrates training and use of a machine learning program, according to some examples.

FIG. 14 is a block diagram showing a machine learning program 1400, according to some examples. The machine learning programs 1400, also referred to as machine learning algorithms or tools, are used as part of the systems described herein to perform operations associated with searches and query responses.

Machine learning is a field of study that gives computers the ability to learn without being explicitly programmed. Machine learning explores the study and construction of algorithms, also referred to herein as tools that may learn from or be trained using existing data and make predictions about or based on new data. Such machine learning tools operate by building a model from example training data 1408 in order to make data-driven predictions or decisions expressed as outputs or assessments (e.g., assessment 1416). Although examples are presented with respect to a few machine learning tools, the principles presented herein may be applied to other machine learning tools.

In some examples, different machine learning tools may be used. For example, Logistic Regression (LR), Naive-Bayes, Random Forest (RF), neural networks (NN), matrix factorization, and Support Vector Machines (SVM) tools may be used.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine learning program 1400 supports two types of phases, namely training phases 1402 and prediction phases 1404. In training phases 1402, supervised learning, unsupervised or reinforcement learning may be used. For example, the machine learning program 1400 (1) receives features 1406 (e.g., as structured or labeled data in supervised learning) and/or (2) identifies features 1406 (e.g., unstructured or unlabeled data for unsupervised learning) in training data 1408. In prediction phases 1404, the machine learning program 1400 uses the features 1406 for analyzing query data 1412 to generate outcomes or predictions, as examples of an assessment 1416.

In the training phase 1402, feature engineering is used to identify features 1406 and may include identifying informative, discriminating, and independent features for the effective operation of the machine learning program 1400 in pattern recognition, classification, and regression. In some examples, the training data 1408 includes labeled data, which is known data for pre-identified features 1406 and one or more outcomes. Each of the features 1406 may be a variable or attribute, such as individual measurable property of a process, article, system, or phenomenon represented by a data set (e.g., the training data 1408). Features 1406 may also be of different types, such as numeric features, strings, and graphs, and may include one or more of content 1418, concepts 1420, attributes 1422, historical data 1424 and/or user data 1426, merely for example.

The concept of a feature in this context is related to that of an explanatory variable used in statistical techniques such as linear regression. Choosing informative, discriminating, and independent features is important for the effective operation of the machine learning program 1400 in pattern recognition, classification, and regression. Features may be of different types, such as numeric features, strings, and graphs.

In training phases 1402, the machine learning program 1400 uses the training data 1408 to find correlations among the features 1406 that affect a predicted outcome or assessment 1416.

With the training data 1408 and the identified features 1406, the machine learning program 1400 is trained during the training phase 1402 at machine learning program training 1410. The machine learning program 1400 appraises values of the features 1406 as they correlate to the training data 1408. The result of the training is the trained machine learning program 1414 (e.g., a trained or learned model).

Further, the training phases 1402 may involve machine learning, in which the training data 1408 is structured (e.g., labeled during preprocessing operations), and the trained machine learning program 1414 implements a relatively simple neural network 1428 capable of performing, for example, classification and clustering operations. In other examples, the training phase 1402 may involve deep learning, in which the training data 1408 is unstructured, and the trained machine learning program 1414 implements a deep neural network 1428 that is able to perform both feature extraction and classification/clustering operations.

A neural network 1428 generated during the training phase 1402, and implemented within the trained machine learning program 1414, may include a hierarchical (e.g., layered) organization of neurons. For example, neurons (or nodes) may be arranged hierarchically into a number of layers, including an input layer, an output layer, and multiple hidden layers. Each of the layers within the neural network 1428 can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which defines the influence of the input from a transmitting neuron to a receiving neuron.

In some examples, the neural network 1428 may also be one of a number of different types of neural networks, including a single-layer feed-forward network, an Artificial Neural Network (ANN), a Recurrent Neural Network (RNN), a symmetrically connected neural network, and unsupervised pre-trained network, a Convolutional Neural Network (CNN), or a Recursive Neural Network (RNN), merely for example.

During prediction phases 1404, the trained machine learning program 1414 is used to perform an assessment. Query data 1412 is provided as an input to the trained machine learning program 1414, and the trained machine learning program 1414 generates the assessment 1416 as output, responsive to receipt of the query data 1412.

Systems and methods described herein include training a machine learning network, such as training to determine a context in messages between users. The machine learning network can be trained to identify a topic of discussion within user interaction in a chat window, in messages sent in posts between users, in interactions in a third party application such as games, and/or other interactions between users. The machine learning algorithm can be trained using historical information that include historical interaction data among users, and resulting context or topics for the interactions.

Training of models, such as artificial intelligence models is necessarily rooted in computer technology, and improves on models by using training data to train such models and thereafter applying the models to new inputs to make inferences on the new inputs. Here, the new inputs can be interaction data of a current user with a friend or other user, such as messages that are currently being sent between two users. The trained machine learning model can determine a topic of discussion within the chat window.

Such training involves complex processing that typically requires a lot of processor computing and extended periods of time with large training data sets, which are typically performed by massive server systems. Training of models can require logistic regression and/or forward/backward propagating of training data that can include input data and expected output values that are used to adjust parameters of the models. Such training is the framework of machine learning algorithms that enable the models to be applied to new data (such as new interaction data) and make predictions that the model was trained for based on the weights or scores that were adjusted during training. Such training reduces false positives and increases the performance of identifying contextual information within interaction data between users.

EXAMPLES

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one processor; and at least one memory component storing instructions that, when executed by the at least one processor, cause the at least one processor to perform operations comprising: determining that a listing of other users of an interaction system is to be displayed on a user interface for a first user; accessing one or more augmentation trigger criteria; applying the one or more augmentation trigger criteria to user profile data corresponding to one or more users of the interaction system; determining, based on the application of the one or more augmentation trigger criteria to the user profile data, that a second user of the other users meets a trigger criterion of the one or more augmentation trigger criteria; identifying at least one recommended content augmentation associated with the trigger criterion; and causing display of a first selectable user interface element associated with the at least one recommended content augmentation with the listing of other users on the user interface.

In Example 2, the subject matter of Example 1 includes, wherein the operations further comprise: in response to a user selection of the first selectable user interface element: applying a first content augmentation of the at least one recommended content augmentation to a camera feed from a camera system; and displaying the camera feed with the applied first content augmentation on the user interface for the first user.

In Example 3, the subject matter of Example 2 includes, wherein the operations further comprise: displaying a second selectable user interface element; and in response to a user selection of the second selectable user interface element, capturing a picture or video of the camera feed with the applied first content augmentation.

In Example 4, the subject matter of Example 3 includes, wherein the operations further comprise: displaying a third selectable user interface element; and in response to a user selection of the third selectable user interface element, transmitting the captured picture or video to the second user.

In Example 5, the subject matter of Examples 1-4 includes, wherein the user profile data includes profile data of the second user, and determining that the second user meets the trigger criterion includes determining at least one of: that a current day is a birthday of the second user, that there is a change to a particular aspect of user profile data of the second user, or that the second user submitted a post for other users to view.

In Example 6, the subject matter of Examples 1-5 includes, wherein the trigger criterion comprises applying a context for one or more messages sent between two users.

In Example 7, the subject matter of Example 6 includes, wherein the operations further comprise: applying the one or more messages sent between the first and second user to a machine learning model, wherein the machine learning model is trained to determine context for messages sent among users; and receiving the context of the messages sent between the first and second user from the machine learning model, wherein identifying the at least one recommended content augmentation is based on the application of the context to the trigger criterion.

In Example 8, the subject matter of Examples 1-7 includes, wherein each of the one or more augmentation trigger criteria is mapped to corresponding sets of content augmentations, wherein identifying the at least one recommended content augmentation comprises identifying a set of content augmentations that is mapped to the trigger criterion.

In Example 9, the subject matter of Example 8 includes, wherein identifying the at least one recommended content augmentation further comprises determining a subset of the mapped set of content augmentations by determining a preference of a type of content augmentation for the first user based on historical selections of content augmentations by the first user.

In Example 10, the subject matter of Examples 8-9 includes, wherein identifying the at least one recommended content augmentation further comprises determining a subset of the mapped set of content augmentations by determining a preference of a type of content augmentation of the second user based on historical selections of content augmentations by the second user.

In Example 11, the subject matter of Examples 1-10 includes, wherein the first selectable user interface element is displayed adjacent to an identifier for or name of the second user in the listing of other users.

In Example 12, the subject matter of Examples 1-11 includes, wherein displaying the listing of other users comprises displaying an individual user interface cell for each of the other users being displayed on the list, wherein the first selectable user interface element is displayed within the individual user interface cell for the second user.

In Example 13, the subject matter of Examples 1-12 includes, wherein the operations further comprise removing the display of the first selectable user interface element in response to a lapse of a predetermined time period, wherein the predetermined time period is associated with the trigger criterion.

In Example 14, the subject matter of Examples 1-13 includes, wherein the at least one recommended content augmentation is configured to augment, modify, or overlay content from a camera feed of a camera system with one or more digital elements, wherein one or more digital elements include at least one of: an image, an animation, or audio.

In Example 15, the subject matter of Examples 1-14 includes, wherein the one or more augmentation trigger criteria are further applied to at least one of: a current time, a current day of the week, a current day of the month, or a holiday.

In Example 16, the subject matter of Examples 1-15 includes, wherein the operations further comprise: displaying a second selectable user interface element configured to enable the user to scroll through a plurality of the recommended content augmentations.

In Example 17, the subject matter of Examples 1-16 includes, wherein the operations further include: in response to determining that user profile data corresponding to the second user meets another trigger criterion, determining that the trigger criterion is of higher priority value the other trigger criterion, wherein identifying the at least one recommended content augmentation associated with the trigger criterion is in response to determining that the trigger criterion is of higher priority than the other trigger criterion.

In Example 18, the subject matter of Examples 1-17 includes, wherein the user profile data includes profile data of the first user, wherein the operations further comprise determining that the profile data of the first user meets the trigger criterion, wherein identifying the at least one recommended content augmentation is in response to determining that the profile data for the first user and the second user meet the trigger criterion.

Example 19 is a method comprising: determining that a listing of other users of an interaction system is to be displayed on a user interface for a first user; accessing one or more augmentation trigger criteria; applying the one or more augmentation trigger criteria to user profile data corresponding to one or more users of the interaction system; determining, based on the application of the one or more augmentation trigger criteria to the user profile data, that a second user of the other users meets a trigger criterion of the one or more augmentation trigger criteria; identifying at least one recommended content augmentation associated with the trigger criterion; and causing display of a first selectable user interface element associated with the at least one recommended content augmentation with the listing of other users on the user interface.

Example 20 is a non-transitory computer-readable storage medium, the computer-readable storage medium including instructions that when executed by at least one computer, cause the least one computer to perform operations comprising: determining that a listing of other users of an interaction system is to be displayed on a user interface for a first user; accessing one or more augmentation trigger criteria; applying the one or more augmentation trigger criteria to user profile data corresponding to one or more users of the interaction system; determining, based on the application of the one or more augmentation trigger criteria to the user profile data, that a second user of the other users meets a trigger criterion of the one or more augmentation trigger criteria; identifying at least one recommended content augmentation associated with the trigger criterion; and causing display of a first selectable user interface element associated with the at least one recommended content augmentation with the listing of other users on the user interface.

Example 21 is at least one machine-readable medium including instructions that, when executed by processing circuitry, cause the processing circuitry to perform operations to implement of Examples 1-20.

Example 22 is an apparatus comprising means to implement of Examples 1-20.

Example 23 is a system to implement of Examples 1-20.

Example 24 is a method to implement of Examples 1-20.

Glossary

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multiprocessor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

CONCLUSION

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The various features, steps, and processes described herein may be used independently of one another, or may be combined in various ways. All possible combinations and subcombinations are intended to fall within the scope of this disclosure. In addition, certain method or process blocks may be omitted in some implementations.

What is claimed is:

1. A system comprising:
   at least one processor; and
   at least one memory component storing instructions that, when executed by the at least one processor, cause the at least one processor to perform operations comprising:
     determining that a listing of other users of an interaction system is to be displayed on a user interface for a first user;
     accessing one or more augmentation trigger criteria;
     applying the one or more augmentation trigger criteria to user profile data corresponding to one or more users of the interaction system;
     determining, based on the application of the one or more augmentation trigger criteria to the user profile data, that a second user of the other users meets a trigger criterion of the one or more augmentation trigger criteria;

identifying at least one recommended content augmentation associated with the trigger criterion; and causing display of a first selectable user interface element associated with the at least one recommended content augmentation with the listing of other users on the user interface.

2. The system of claim 1, wherein the operations further comprise:

in response to a user selection of the first selectable user interface element:

applying a first content augmentation of the at least one recommended content augmentation to a camera feed from a camera system; and displaying the camera feed with the applied first content augmentation on the user interface for the first user.

3. The system of claim 2, wherein the operations further comprise:

displaying a second selectable user interface element; and in response to a user selection of the second selectable user interface element, capturing a picture or video of the camera feed with the applied first content augmentation.

4. The system of claim 3, wherein the operations further comprise:

displaying a third selectable user interface element; and in response to a user selection of the third selectable user interface element, transmitting the captured picture or video to the second user.

5. The system of claim 1, wherein the user profile data includes profile data of the second user, and determining that the second user meets the trigger criterion includes determining at least one of: that a current day is a birthday of the second user, that there is a change to a particular aspect of user profile data of the second user, or that the second user submitted a post for other users to view.

6. The system of claim 1, wherein the trigger criterion comprises applying a context for one or more messages sent between two users.

7. The system of claim 6, wherein the operations further comprise:

applying the one or more messages sent between the first and second user to a machine learning model, wherein the machine learning model is trained to determine context for messages sent among users; and receiving the context of the messages sent between the first and second user from the machine learning model, wherein identifying the at least one recommended content augmentation is based on the application of the context to the trigger criterion.

8. The system of claim 1, wherein each of the one or more augmentation trigger criteria is mapped to corresponding sets of content augmentations, wherein identifying the at least one recommended content augmentation comprises identifying a set of content augmentations that is mapped to the trigger criterion.

9. The system of claim 8, wherein identifying the at least one recommended content augmentation further comprises determining a subset of the mapped set of content augmentations by determining a preference of a type of content augmentation for the first user based on historical selections of content augmentations by the first user.

10. The system of claim 8, wherein identifying the at least one recommended content augmentation further comprises determining a subset of the mapped set of content augmentations by determining a preference of a type of content augmentation of the second user based on historical selections of content augmentations by the second user.

11. The system of claim 1, wherein the first selectable user interface element is displayed adjacent to an identifier for or name of the second user in the listing of other users.

12. The system of claim 1, wherein displaying the listing of other users comprises displaying an individual user interface cell for each of the other users being displayed on the list, wherein the first selectable user interface element is displayed within the individual user interface cell for the second user.

13. The system of claim 1, wherein the operations further comprise removing the display of the first selectable user interface element in response to a lapse of a predetermined time period, wherein the predetermined time period is associated with the trigger criterion.

14. The system of claim 1, wherein the at least one recommended content augmentation is configured to augment, modify, or overlay content from a camera feed of a camera system with one or more digital elements, wherein one or more digital elements include at least one of: an image, an animation, or audio.

15. The system of claim 1, wherein the one or more augmentation trigger criteria are further applied to at least one of: a current time, a current day of the week, a current day of the month, or a holiday.

16. The system of claim 1, wherein the operations further comprise:

displaying a second selectable user interface element configured to enable the user to scroll through a plurality of the recommended content augmentations.

17. The system of claim 1, wherein the operations further include:

in response to determining that user profile data corresponding to the second user meets another trigger criterion, determining that the trigger criterion is of higher priority value the other trigger criterion, wherein identifying the at least one recommended content augmentation associated with the trigger criterion is in response to determining that the trigger criterion is of higher priority than the other trigger criterion.

18. The system of claim 1, wherein the user profile data includes profile data of the first user, wherein the operations further comprise determining that the profile data of the first user meets the trigger criterion, wherein identifying the at least one recommended content augmentation is in response to determining that the profile data for the first user and the second user meet the trigger criterion.

19. A method comprising:

determining that a listing of other users of an interaction system is to be displayed on a user interface for a first user;

accessing one or more augmentation trigger criteria;

applying the one or more augmentation trigger criteria to user profile data corresponding to one or more users of the interaction system;

determining, based on the application of the one or more augmentation trigger criteria to the user profile data, that a second user of the other users meets a trigger criterion of the one or more augmentation trigger criteria;

identifying at least one recommended content augmentation associated with the trigger criterion; and causing display of a first selectable user interface element associated with the at least one recommended content augmentation with the listing of other users on the user interface.

20. A non-transitory computer-readable storage medium, the computer-readable storage medium including instructions that when executed by at least one computer, cause the least one computer to perform operations comprising:
- determining that a listing of other users of an interaction system is to be displayed on a user interface for a first user;
- accessing one or more augmentation trigger criteria;
- applying the one or more augmentation trigger criteria to user profile data corresponding to one or more users of the interaction system;
- determining, based on the application of the one or more augmentation trigger criteria to the user profile data, that a second user of the other users meets a trigger criterion of the one or more augmentation trigger criteria;
- identifying at least one recommended content augmentation associated with the trigger criterion; and
- causing display of a first selectable user interface element associated with the at least one recommended content augmentation with the listing of other users on the user interface.

* * * * *